United States Patent
Yamasaki et al.

(10) Patent No.: US 11,752,880 B2
(45) Date of Patent: *Sep. 12, 2023

(54) MM WAVE RADAR FOR ENHANCED MOBILITY APPLICATIONS

(71) Applicant: Alpine Electronics of Silicon Valley, Inc., Santa Clara, CA (US)

(72) Inventors: Thomas Yamasaki, Anaheim Hills, CA (US); Rei Kanda, San Jose, CA (US); Mela Lin, Cupertino, CA (US)

(73) Assignee: ALPINE ELECTRONICS OF SILICON VALLEY, INC., Santa Clara, CA (US)

( * ) Notice: Subject to any disclaimer, the term of this patent is extended or adjusted under 35 U.S.C. 154(b) by 205 days.

This patent is subject to a terminal disclaimer.

(21) Appl. No.: 17/018,782

(22) Filed: Sep. 11, 2020

(65) Prior Publication Data
US 2021/0138912 A1  May 13, 2021

Related U.S. Application Data

(63) Continuation of application No. 16/657,771, filed on Oct. 18, 2019, now Pat. No. 10,773,598.

(51) Int. Cl.
*B60L 15/20* (2006.01)
*B60L 7/10* (2006.01)
(Continued)

(52) U.S. Cl.
CPC .............. *B60L 15/2009* (2013.01); *B60L 7/10* (2013.01); *B62J 45/20* (2020.02); *B62J 45/41* (2020.02);
(Continued)

(58) Field of Classification Search
CPC .... B60L 15/2009; B60L 7/10; B60L 2200/12; B60L 2200/24; B60L 2240/12; B60L 2240/421; B60L 7/18; B60L 2240/16; B60L 3/0015; B62J 45/20; B62J 45/41; B62J 27/00; B62J 45/40; B62K 11/00; B62K 2202/00; B62K 3/002; G01S 13/931; G01S 2013/93185; G01S 2013/9319; G01S 17/931; G01S 15/931; G01S 2013/9323;
(Continued)

(56) References Cited

U.S. PATENT DOCUMENTS

| | | | |
|---|---|---|---|
| 10,245,937 | B2 | 4/2019 | Gillett |
| 2017/0190335 | A1 | 7/2017 | Gillett |

(Continued)

FOREIGN PATENT DOCUMENTS

JP  2019532864 A  11/2019

OTHER PUBLICATIONS

Yamasaki, Thomas, et al. U.S. Appl. No. 16/657,771 Notice of Allowance dated May 12, 2020, pp. 1-9.

*Primary Examiner* — Brian P Sweeney
(74) *Attorney, Agent, or Firm* — Perkins Coie LLP

(57) ABSTRACT

Disclosed herein are systems, devices, and processes that use millimeter wave radar or other remote sensing to enhance mobility applications. Obstacles may be detected using remote sensing. Acceleration of a mobility apparatus may be controlled based on detection of the obstacle. The controlling may be performed based on characteristics of the obstacle, including location, type of obstacle, and/or trajectory of the obstacle.

12 Claims, 20 Drawing Sheets

(51) Int. Cl.
*B62K 11/00* (2006.01)
*B62J 45/41* (2020.01)
*B62J 45/20* (2020.01)
*G01S 13/931* (2020.01)

(52) U.S. Cl.
CPC ............ *B62K 11/00* (2013.01); *G01S 13/931* (2013.01); *B60L 2200/12* (2013.01); *B60L 2200/24* (2013.01); *B60L 2240/12* (2013.01); *B60L 2240/421* (2013.01); *B62K 2202/00* (2013.01); *G01S 2013/9319* (2020.01); *G01S 2013/93185* (2020.01)

(58) Field of Classification Search
CPC ....... G01S 2013/932; G01S 2013/9324; G01S 2013/93271; Y02T 10/64; Y02T 10/72
See application file for complete search history.

(56) References Cited

U.S. PATENT DOCUMENTS

2019/0248439 A1* 8/2019 Wang .................... B62K 11/10
2020/0130771 A1* 4/2020 Jacobsz Rosier ........ B62J 45/20

* cited by examiner

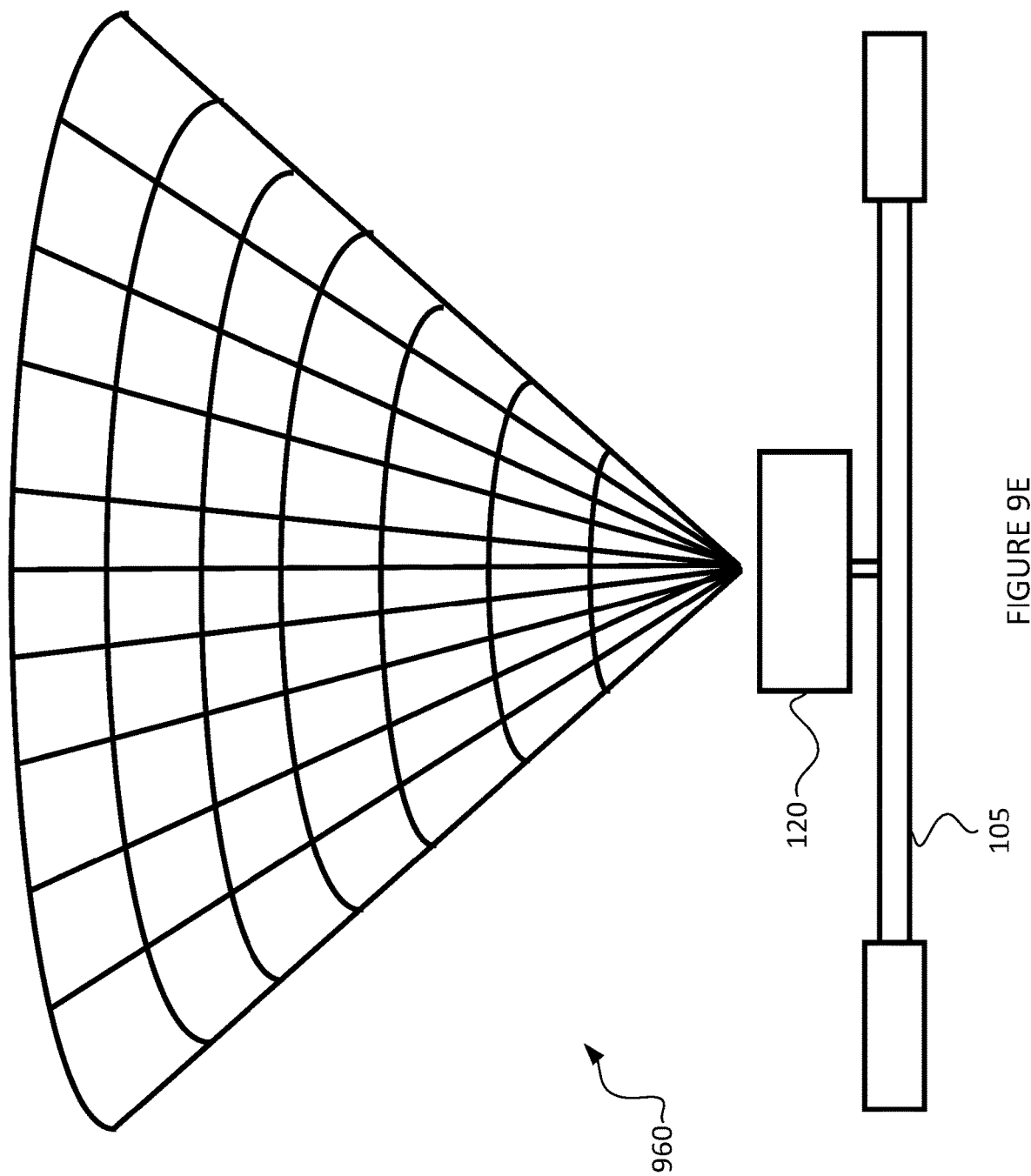

MM WAVE RADAR FOR ENHANCED MOBILITY APPLICATIONS

CROSS-REFERENCE TO RELATED APPLICATIONS

This application is a continuation of co-pending U.S. application Ser. No. 16/657,771, filed Oct. 18, 2019, which is incorporated herein in its entirety by this reference thereto.

TECHNICAL FIELD

This patent document relates to systems, devices, and processes that use millimeter wave radar or other remote sensing to enhance mobility applications.

BACKGROUND

The existence of mobile apparatuses, such as electric scooters, electric bicycles, and electric skateboards are known. These mobility apparatuses may be powered by a motor. A user of the mobility apparatus may control acceleration and steering of the mobile apparatus.

SUMMARY

Disclosed herein are systems, devices, and processes that use millimeter wave radar or other remote sensing to enhance mobility applications. Obstacles may be detected using remote sensing. Acceleration of a mobile apparatus may be controlled based on detection of the obstacle. The controlling may be performed based on characteristics of the obstacle, including location, type of obstacle, and/or trajectory of the obstacle.

A system is disclosed. The system includes a mobility apparatus. The system includes a remote sensor configured to generate sensor data about a vicinity of the mobility apparatus. The system includes a computing module configured to determine, based on the sensor data, whether an obstacle is present in the vicinity of the mobility apparatus. The system includes a drive controller configured to alter the acceleration of the mobility apparatus responsive to the determination by the computing module as to whether an obstacle is present in the vicinity of the mobility apparatus.

BRIEF DESCRIPTION OF THE DRAWINGS

FIG. 9E is a schematic diagram of remote sensing for a mobility apparatus according to some embodiments of the present disclosure.

DETAILED DESCRIPTION

Figure 1:
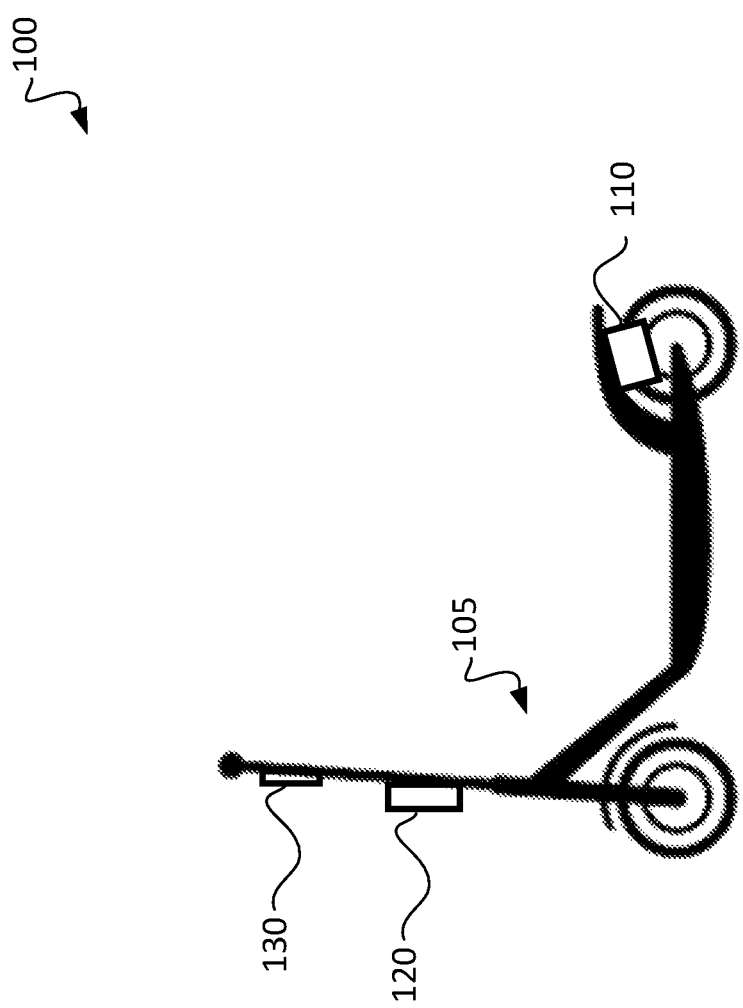
FIG. 1 is a schematic diagram of a mobility system according to some embodiments of the present disclosure.

The use of mobility apparatuses, such as electric scooters, electric bicycles, and electric skateboards, has increased significantly in recent years. This has been spurred particularly by the expansion of the market for so called "dockless" scooters and "dockless" bicycles. With these systems, electric-powered mobility apparatuses may be left over significant portions of an urban area for human users to "rent" or "check out." A user that rents a mobility apparatus, e.g., a dockless scooter, may be able to use the scooter for several hours or several minutes, with the fee increasing with the proportion of time that the user uses the scooter.

These system have become particular popular recently, for various reasons. First, users are typically able to find a dockless scooter anywhere in a given urban area without travelling very far. Second, the user is often able to rent the scooter for a rather small fee. Third, because the dockless scooter is electric-powered, the user is able to travel on the dockless scooter without having to exert any significant physical energy. For these and other reasons, dockless scooters and other mobility apparatuses have become a common choice for users' transportation over short distances. When combined with other, longer-distance transportation (e.g., a commuter train), the mobility apparatuses are often used to fill the "last mile mobility" role for the user. For similar reasons, mobility apparatuses are sometimes referred to as providing "micro mobility."

But the proliferation of mobility apparatuses have also created numerous problems. First, because the mobility apparatuses may be "dockless," they may be left in a wide variety of inappropriate locations (e.g., blocking a sidewalk). Second, because many of the users only rent the mobility apparatuses, and only do so for short periods of time, the average user of a mobility apparatus may be quite novice. Third, because there are numerous competing dockless systems, across which a user may spread his time, the user may not ultimately be particularly familiar with the equipment (e.g., the type of scooter, the acceleration characteristics of the scooter, the steering characteristics of the scooter) that the user is using at any given point in time. Fourth, there is often inconsistency with whether a user operates a mobility apparatus in the street, in a protected lane adjacent to the street, on the sidewalk, or elsewhere. This causes confusion for the users of the mobility apparatuses as well as pedestrians, automobile drivers, and other people that interact with the mobility apparatus users in the urban environments.

Because of these problems, and others, a high rate of injuries, deaths, and other incidents have been reported with users of mobility apparatuses. Hence a solution is needed for mobility apparatuses that improves the safety of the apparatuses in light of the foregoing problems. But a user-implemented solution is unlikely to be feasible, as human preferences and market forces make it unlikely that any mobility apparatus user or mobility apparatus system operator will seek training or some other approach to reducing the rate of incidents on mobility apparatuses. Instead, a technological solution is needed that will address these problems.

FIG. 1 is a schematic diagram of a mobility system 100 according to some embodiments of the present disclosure.

The mobility system 100 may include a mobility apparatus 105. The mobility apparatus 105 may be provided as an electric scooter. The mobility apparatus 105 may be provided in other forms in various embodiments, such as an electric bicycle, and electric skateboard, a children's electric vehicle (e.g., power wheels), a segway, a motorcycle, or otherwise. In some embodiments, the mobility apparatus 105 may be provided as a Xiaomi M365 scooter.

The mobility system 100 may include a drive controller 110. The driver controller 110 may be an electronic controller that controls various physical drive components of the mobility apparatus 105, such as regenerative brakes, non-regenerative brakes, a throttle, or others. The drive controller 110 may control the acceleration of the mobility apparatus 105 by, e.g., activating the regenerative brakes, deactivating the throttle, or otherwise.

The mobility system 100 may include a remote sensor 120. The remote sensor 120 may be able to sense the vicinity the mobility apparatus 105. For example, the remote sensor 120 may be able to detect obstacles in the area around the mobility apparatus, such as light poles, pedestrians, dogs, automobiles, or others. In some embodiments, the remote sensor 120 may be provided as a millimeter wave radar module. In such embodiments, the millimeter wave radar module may use transmission and receipt of radar waves in the millimeter range to detect obstacles in the vicinity of the mobility apparatus 105. The remote sensor 120 may be provided in other forms in various embodiments, such as a different form of electromagnetic radar, an acoustic wave remote sensor, lidar, or otherwise. In some embodiments, the remote sensor 120 may be provided as an Alpine millimeter wave radar module.

In some embodiments, implementation of the remote sensor 120 as a millimeter wave radar module may be advantageous for various reasons. For example, a millimeter wave radar module may provide higher resolution sensing than other remote sensing technologies, such as a single point ultrasonic sensor. As another example, a millimeter wave radar module may allow for more flexible implementations as compared to other remote sensing technologies. For instance, the millimeter wave radar module may not require a line-of-sight type implementation. As another example, a millimeter wave radar module may allow the remote sensor 120 to be implemented with a more discrete physical profile. For instance, the millimeter wave radar module may not require a visible aperture, an exposed mirror, or other less discreet features of other remote sensing technologies. As another example, a millimeter wave radar module may allow for a simpler and lower cost implementation. For instance, the millimeter wave radar module may not require the greater complexity and higher cost associated with implementing moving parts as required by other remote sensing technologies (e.g., lidar). As another example, a millimeter wave radar module may have lower power requirements than other remote sensing technologies (e.g., lidar, camera). This may be especially important in a mobility system, where the source of power may come from a battery with a limited duration of charge, and for which higher costs are required for recharging (e.g., team of workers to retrieve, charge, and return mobility system nightly).

The mobility system 100 may include a computing module 130. The computing module 130 may operate to process the sensor data from the remote sensor 120 in order to determine whether an obstacle is present in the vicinity of the mobility apparatus 105. The computing module 130 may determine other information about such an obstacle, such as its location, its size, its trajectory of motion, the time of object that the obstacle is, or others. The computing module 130 may provide commands to the drive controller 110 in response to these determinations. As such, the computing module 130 may control operation of the mobility apparatus 105 based on the detection of an obstacle in the vicinity of the mobility apparatus 105. The computing module 130 may be provided in a variety of forms, such as a system on a chip, a mini computer, a electronic controller, a processor in some other component (e.g., as a component of the drive controller 110 or the remote sensor 120), or otherwise. In some embodiments, the computing module 130 may be provided as a Raspberry Pi.

Figure 2:
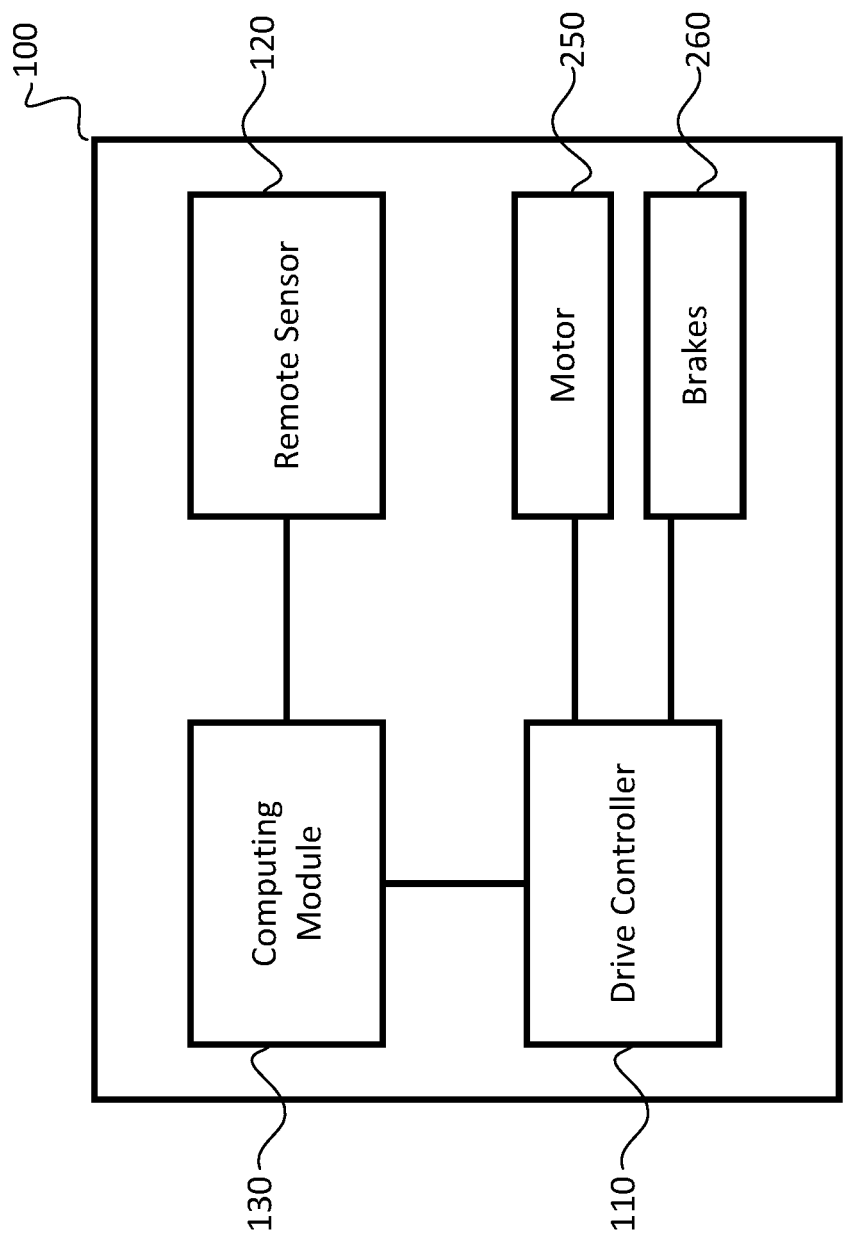
FIG. 2 is a block diagram of a mobility system according to some embodiments of the present disclosure.

FIG. 2 is a block diagram of a mobility system 100 according to some embodiments of the present disclosure. The mobility system 100 may include components as described previously, including a drive controller 110, a remote sensor 120, and a computing module 130.

The mobility system 100 may also include a motor 250 and/or brakes 260. The mobility system 100 may use the motor 250 and/or brakes 260 to control the acceleration (including both increase and decrease in velocity) of the mobility apparatus 105. In some embodiments, the motor 250 may be an electric motor. The motor 250 maybe provided in a variety of other forms in various embodiments, such as a gasoline engine, a diesel engine, manually-cranked engine, or others. The brakes 260 may be provided as regenerative brakes. In such embodiments, the brakes 260 may be provided integrated with the motor 250, such as for allowing the motor to recapture energy generated by the activation of the brakes 260. The brakes 260 may be provided in other forms in various embodiments, such as non-regenerative braking, disk brakes, drum brakes, or others.

Figure 3:
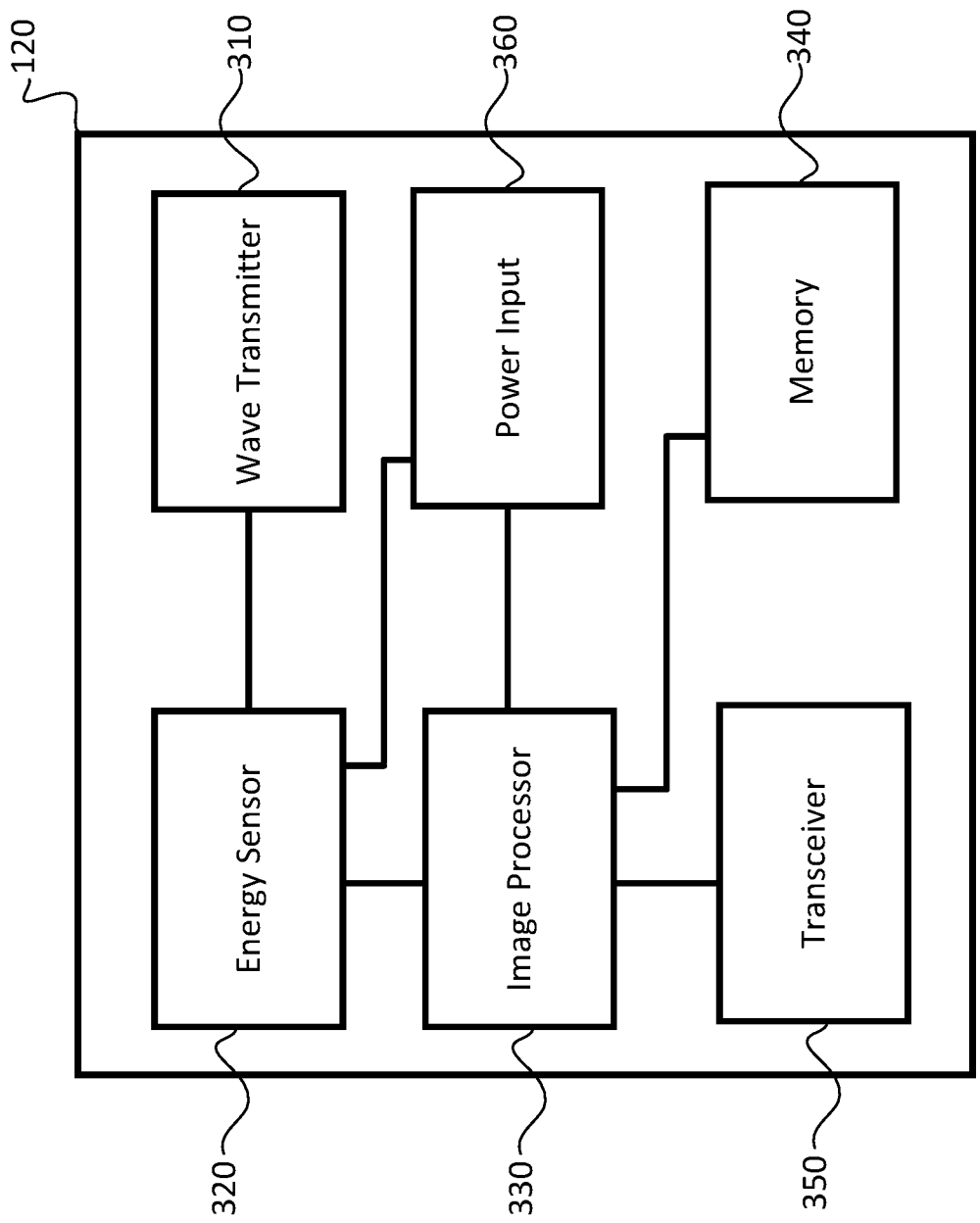
FIG. 3 is a block diagram of a remote sensor according to some embodiments of the present disclosure.

FIG. 3 is a block diagram of a remote sensor 120 according to some embodiments of the present disclosure. The remote sensor 120 may be provided as described elsewhere herein.

The remote sensor 120 may include a wave transmitter 310. The wave transmitter 310 may operate to transmit an electromagnetic way into the vicinity of the mobility apparatus 105. In some embodiments, the wave transmitter 310 may transmit an electromagnetic wave in the millimeter range. The wave transmitter 310 may transmit other types of electromagnetic or other waves in various embodiments.

The remote sensor 120 may include an energy sensor 320. The energy sensor 320 may detect the presence of reflected wave energy in the vicinity of the mobility apparatus 105. For example, the energy sensor 320 may detect energy from a wave previously transmitted by the wave transmitter 310 that has reflected off of an obstacle in the vicinity of the mobility apparatus 105 and then returned in the direction of the mobility apparatus 105. In some embodiments, the energy sensor 310 may be a millimeter wave detector. The energy sensor 320 may detect other types of electromagnetic energy or other energy in various embodiments.

The remote sensor 120 may include an image processor 330. The image processor 330 may process information about energy detected by the energy sensor 320 in order to generate image data representative of the vicinity of the mobility apparatus 105. For example, the image processor 330 may process data from energy sensor 320 in order to generate a two-dimensional field of data that represents the magnitude of energy detected in the area in front of the mobility apparatus 105. For example, the image processor 330 may generate an image with high data values in a direction where data from the energy sensor 320 indicates a short period of energy reflection (e.g., wave energy reflected off of an object and returned to the energy sensor 320 in a very short period of time). The image processor 330 may be provided in other forms in various embodiments.

The remote sensor 120 may include additional components, such as memory 340, transceiver 350, and/or power input 360. The remote sensor 120 may use the memory 340 in order to store data processed by and/or generated by the image processor 330. For example, the image processor 330 may stored the X recent images generated based on processing data from the energy sensor 320. X may be two in some embodiments. The memory 340 may store other data in various embodiments. The remote sensor 120 may use transceiver 350 to transmit and/or receive data. For example the remote sensor 120 may use the transceiver 350 to transmit image data processed by and/or generated by the image processor 330 to other components in the mobility system 100 (e.g., computing module 130). The remote sensor may use transceiver 350 to receive configuration parameters from other components of the mobility system 100, (e.g., from computing module 130). The transceiver 350 may send and/or receive other data in various embodiments. The remote sensor 120 may use power input 360 to provide electric energy to other components of the remote sensor 120. Power input 360 may be provided in various forms, such as battery, a direct current input line, an alternating current input line, an alternating current input line with rectifier, or others.

Figure 4:
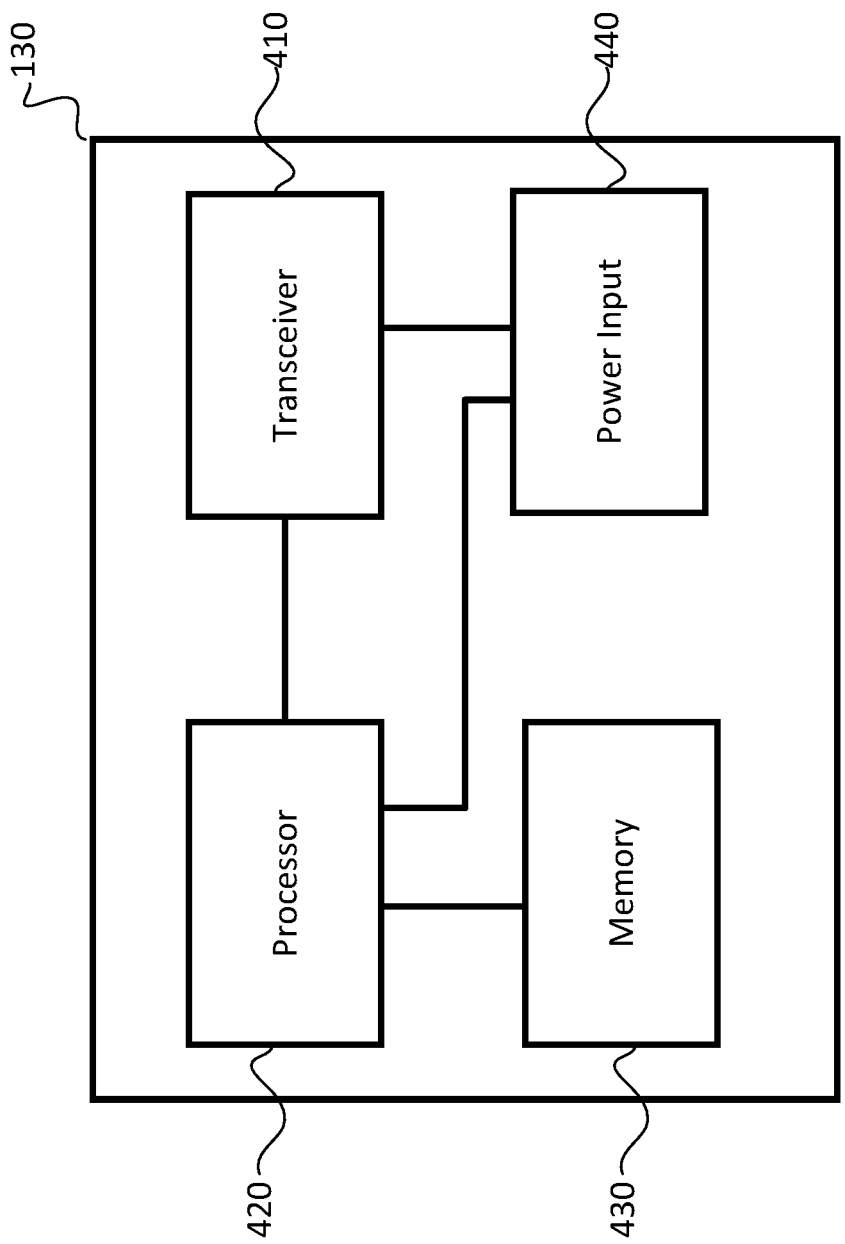
FIG. 4 is a block diagram of a computing module according to some embodiments of the present disclosure.

FIG. 4 is a block diagram of a computing module 130 according to some embodiments of the present disclosure. The computing module 130 may be provided as described elsewhere herein.

The computing module 130 may include a processor 420. The computing module 130 may use the processor 420 to process data received from remote sensor 120. For example the processor 420 may process image data received from remote sensor 120 (e.g., as processed by and/or generated by image processor 330). The processor 420 may process other sensor data generated by the remote sensor 120.

The processor 420 may process the sensor data in order to determine whether an obstacle is present in the vicinity of the mobility apparatus 105. For example, the processor 420 may process sensor data from the remote sensor 120 to determine whether there is a large spatial area in the vicinity of the mobility apparatus 105 for which transmitted wave energy was reflected back towards the mobility apparatus 105 in a relatively short period of time. The processor 420 may process sensor data (e.g., a two-dimensional field generated by image processor 330) in order to detect such an obstacle. The processor may determine whether an obstacle is present in the vicinity of the mobility apparatus 105 in other ways in various embodiments.

The processor 420 may use stored data to determine whether an obstacle is present in the vicinity of the mobility apparatus 105. For example, the processor 420 may use parameters stored in memory 430. The parameters may include, for example, an energy threshold value that identifies a minimum amount of energy necessary for the sensor data to be interpreted as identifying an obstacle. As another example, the processor 420 may use artificial intelligence parameters stored in memory 430. The processor 420 may retrieve parameters defining an artificial neural network, which the processor 420 may use to determine whether an obstacle is present in the vicinity of the mobility apparatus 105. The processor 420 may use other stored data in various embodiments.

The processor 420 may generate control instructions in various embodiments. The processor 420 may generate control instructions based on determining that an obstacle is present in the vicinity of the mobility apparatus 105. For example, if the processor 420 determines that an obstacle is present in the vicinity of the mobility apparatus 105, the processor 420 may generate a reduce velocity (i.e., "decelerate") instruction. The processor 420 may transmit the control instruction to the drive controller 110, using the transceiver 410. The processor 420 may generate other control instruction in various embodiments, such as an increase velocity instruction, a brake instruction, an increase braking instruction, a decrease braking instruction, a disengage throttle instruction, an increase throttle instruction, a decrease throttle instruction, a steering instruction, a steer left instruction, a steer right instruction, and/or others.

The processor 420 may filter sensor data in various embodiments. The processor 420 may receive sensor data generated by the remote sensor 120. In such embodiments, the processor 420 may filter the received sensor data. For example, the processor 420 may discard extraneous data. As another example, the process 420 may perform a transform operation on the sensor data in order to process the sensor data in a different domain (e.g., in the frequency domain). The processor 420 may filter the sensor data in other ways in various embodiments. In some embodiment, a different component may filter sensor data, such as image processor 330 or another component of remote sensor 120.

The processor 420 may filter output data in various embodiments. The processor 420 may filter results of applying sensor data to a neural network structure. For example, the processor 420 may filter among different types of identified objects in the environment around a mobility system. The processor 420 may filter stationary objects from mobile objects. The processor 420 may filter non-obstacle objects from obstacle objects. The processor 420 may filter objects based on a classification of the objects (e.g., person, vehicle, stationary obstacle). The processor 420 may filter the output data in other ways in various embodiments. In some embodiments the processor 420 may generate control instructions based on the filtering of the output data.

The computing module 130 may include additional components, such as memory 430, transceiver 410, and/or power input 440. The computing module 130 may use the memory 430 as described previously. The memory 430 may store other data in various embodiments. The computing module 130 may use transceiver 410 as described previously. The transceiver 410 may transmit and/or receive data. For example the computing module 130 may use the transceiver 410 to receive image data from other components in the mobility system 100 (e.g., remote sensor 120). The computing module 130 may use transceiver 410 to transmit data to other components in the mobility system 100 (e.g., drive controller 110). The transceiver 410 may send and/or receive other data in various embodiments. The computing module 130 may use power input 440 to provide electric energy to other components of the computing module 130. Power input 440 may be provided in various forms, such as battery, a direct current input line, an alternating current input line, an alternating current input line with rectifier, or others.

Figure 5:
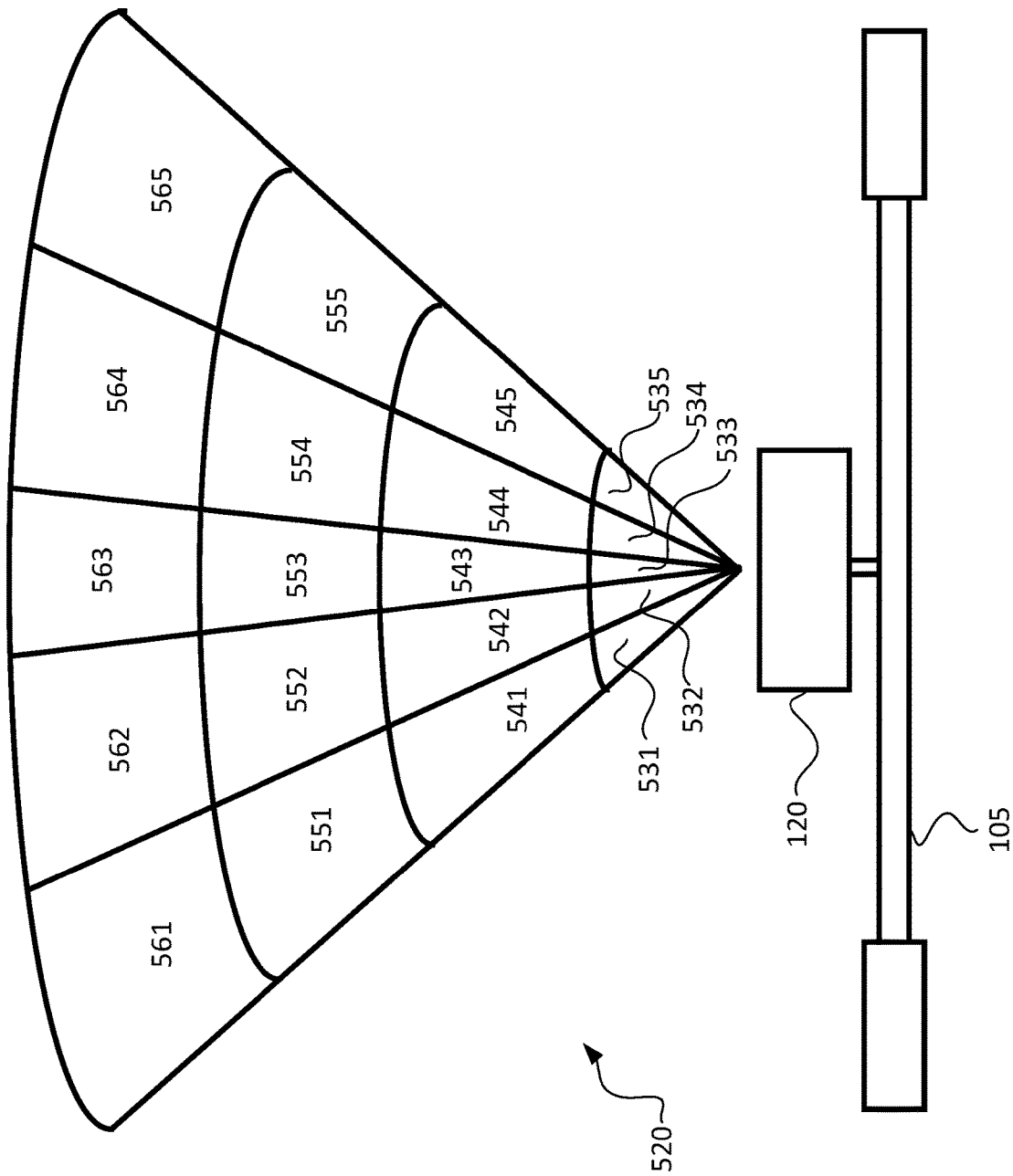
FIG. 5 is a schematic diagram of remote sensing for a mobility apparatus according to some embodiments of the present disclosure.

FIG. 5 is a schematic diagram of remote sensing 520 for a mobility apparatus according to some embodiments of the present disclosure. The remote sensing 520 may be performed by remote sensor 120. The remote sensor 120 may be attached to the mobility apparatus 105. For example, the remote sensor 120 may be attached to the handlebars and/or vertical post at the front of the mobility apparatus 105. The remote sensor 120 may be provided in a forward-facing position. With such a configuration, the remote sensor 120 may be capable of sensing the area in front of the mobility apparatus 105.

The remote sensing 520 may include sensing one or more sectors. For example, the remote sensing 520 may include sensing sector 531, sector 532, sector 533, sector 534, sector 535, sector 541, sector 542, sector 543, sector 544, sector 545, sector 551, sector 552, sector 553, sector 554, sector 555, sector 561, sector 562, sector 563, sector 564, and/or sector 565. For instance, remote sensing 520 may involve the remote sensor 120 transmitting radar waves into the space in front of the mobility apparatus 105, as illustrated in overhead view in FIG. 5. The remote sensing 520 may be capable of detecting the presence of obstacles present in any of the sectors 531 to 565 using the remote sensor 120.

Figure 6:
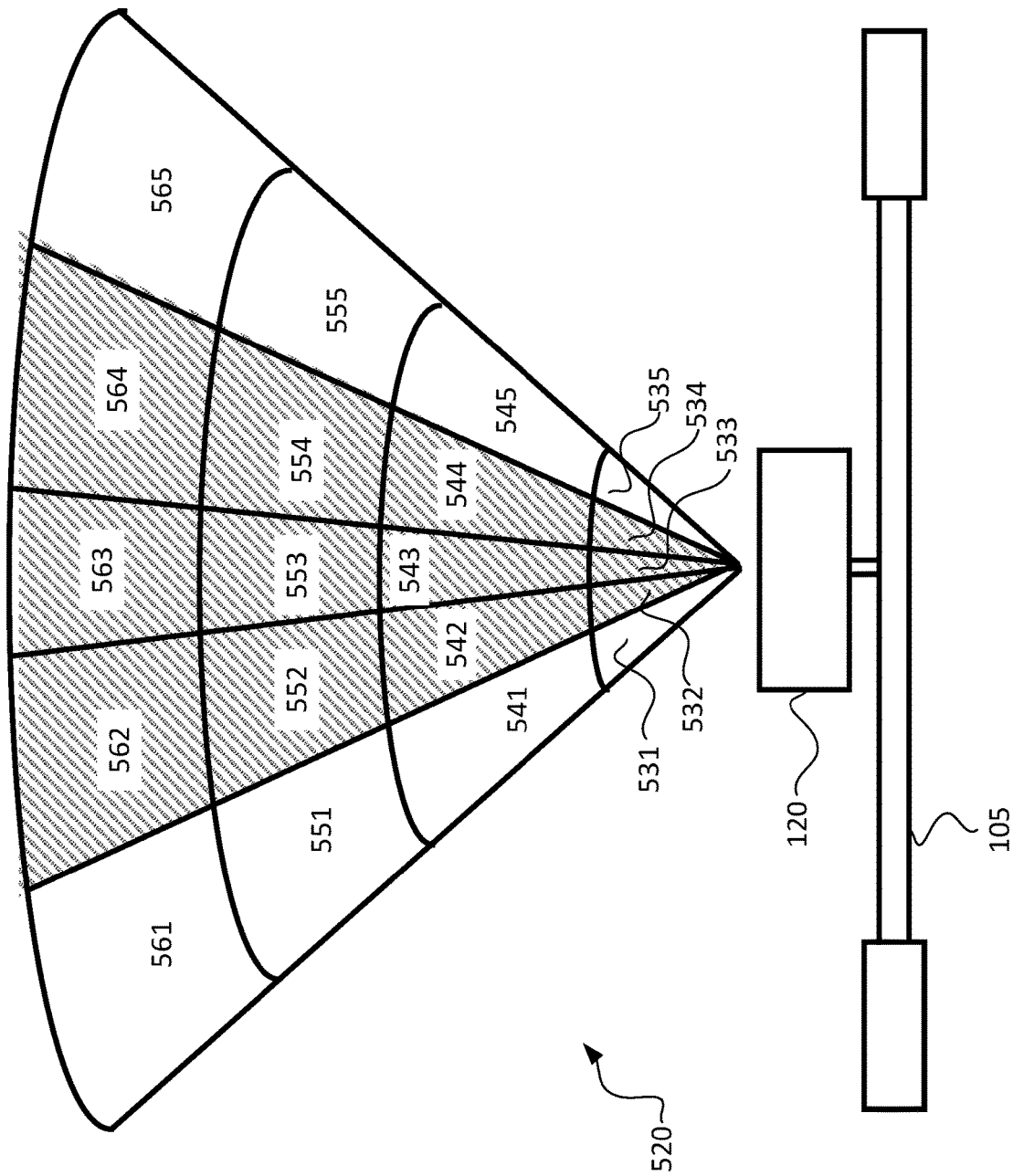
FIG. 6 is a schematic diagram of remote sensing for a mobility apparatus according to some embodiments of the present disclosure.

FIG. 6 is a schematic diagram of remote sensing 520 for a mobility apparatus according to some embodiments of the present disclosure. Remote sensing 520 may be provided as described elsewhere herein.

As illustrated, remote sensing 520 may include a classification or categorization of one or more of the sectors 531 to 565. For instance, the remote sensing 520 may identify a "low risk" category for sector 531, sector 535, sector 541, sector 545, sector 551, sector 555, sector 561, and sector 565. The remote sensing 520 may identify a "high risk" category for sector 532, sector 533, sector 534, sector 542, sector 543, sector 544, sector 552, sector 553, sector 554, sector 562, sector 563, and sector 564. Remote sensing 520 may identify a sector as "high risk" if there is a higher risk that an obstacle present in that sector will cause a collision with the mobility apparatus 105. Remote sensing 520 may identify a sector as "low risk" if there is a lower risk that an obstacle present in that sector will cause a collision with the mobility apparatus 105. Remote sensing 520 may use other categories or classes for sectors in various embodiments.

Figure 7:
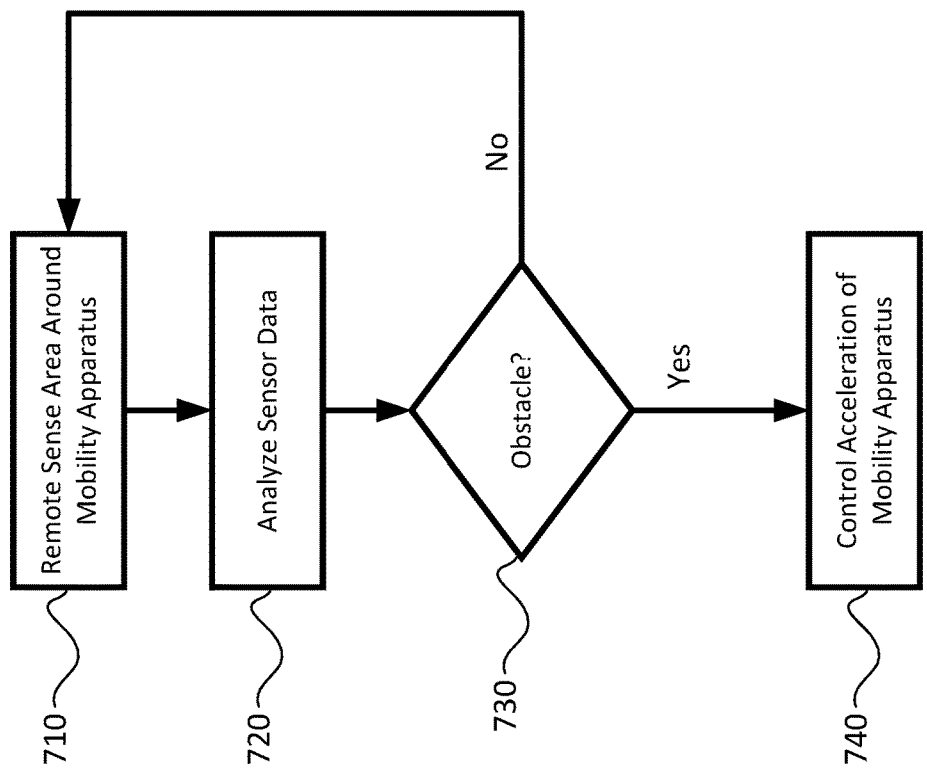
FIG. 7 is a flowchart for a process of controlling a mobility apparatus according to some embodiments of the present disclosure.

FIG. 7 is a flowchart for a process 700 of controlling a mobility apparatus according to some embodiments of the present disclosure. The process 700 may be performed using the mobility system 100 in some embodiments.

At block 710, remote sensing is performed in the area around a mobility apparatus. The remote sensing may include using a remote sensor 120, as described elsewhere herein. The remote sensing may include sensing an area in front of the mobility apparatus 105 using millimeter wave radar.

At block 720, sensor data is analyzed. The data analysis may include using a computing module 130 to process sensor data captured by the remote sensor 120, as described elsewhere herein. In some embodiments, the data analysis may be performed by other components, such as image processor 330, as described elsewhere herein.

The data analysis of block 720 may include analyzing sensor data to determine whether an obstacle is present in the area around the mobility apparatus. For example, the data analysis may include determining whether an obstacle is present in one or more sectors sensed by the remote sensor 120 in front of the mobility apparatus 105. The data analysis of block 720 may include applying a decision tree structure or other previously-trained structure.

At block 730, a determination is made as to whether there is an obstacle. For example, a determination may be made as to whether an obstacle is present in one or more sectors sensed by the remote sensor 120 in front of the mobility apparatus 105. In some embodiments, block 730 may include using a result of the analysis performed at block 720.

At block 730, if it is determined that no obstacle is present, then the process continues at block 710.

At block 730, if it is determined that an obstacle is present, then the process continues at block 740.

At block 740, acceleration of a mobility apparatus is controlled. The acceleration of the mobility apparatus 105 may be controlled using the drive controller 110, as described elsewhere herein. The acceleration of the mobility apparatus may be controlled based on a control instruction generated based on the analysis of the sensor data at block 720 and/or as a result of the determination at block 730. In some embodiments, controlling the acceleration of the mobility apparatus may include applying brakes of the mobility apparatus, releasing brakes of the mobility apparatus, engaging throttle of the mobility apparatus, and/or disengaging a throttle of the mobility apparatus.

In various embodiments, the process 700 may include more or fewer blocks than those just escribed. For example, the process 700 may include the remote sensor 120 transmitting sensor data to the computing device 130. As another example, the process 700 may include the computing device filtering the sensor data received from the remote sensor 120. In such embodiments, the computing module 130 may perform the data analysis of block 720 using the filtered sensor data. As another example, the process 700 may include the computing device filtering an output of the processing at block 720.

Figure 8:
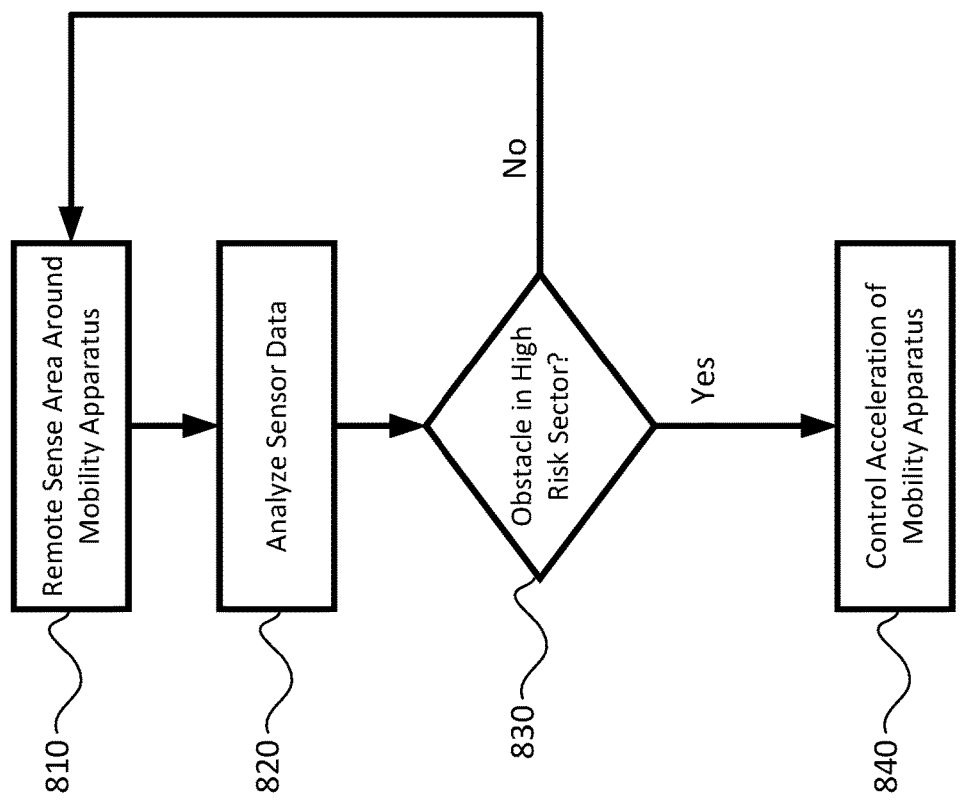
FIG. 8 is a flowchart for a process of controlling a mobility apparatus according to some embodiments of the present disclosure.

FIG. 8 is a flowchart for a process 800 of controlling a mobility apparatus according to some embodiments of the present disclosure. The process 800 may be performed using the mobility system 100 in some embodiments.

At block 810, remote sensing is performed in the area around a mobility apparatus. The remote sensing may include using a remote sensor 120, as described elsewhere herein. The remote sensing may include sensing an area in front of the mobility apparatus 105 using millimeter wave radar.

At block 820, sensor data is analyzed. The data analysis may include using a computing module 130 to process sensor data captured by the remote sensor 120, as described elsewhere herein. In some embodiments, the data analysis may be performed by other components, such as image processor 330, as described elsewhere herein.

The data analysis of block 820 may include analyzing sensor data to determine whether an obstacle is present in the area around the mobility apparatus. For example, the data analysis may include determining whether an obstacle is present in one or more sectors sensed by the remote sensor 120 in front of the mobility apparatus 105. The data analysis of block 820 may include applying a decision tree structure or other previously-trained structure.

The data analysis of block 820 may include analyzing sensor data to determine whether an obstacle is present in a high risk sector in the area around the mobility apparatus. For example, the data analysis may include determining whether an obstacle is present in one or more sectors sensed by the remote sensor 120 in front of the mobility apparatus 105 that are categorized as corresponding to a high risk of collision.

At block 830, a determination is made as to whether there is an obstacle in a high risk sector. For example, a determination may be made as to whether an obstacle is present in one or more sectors sensed by the remote sensor 120 in front of the mobility apparatus 105 that are categorized as corresponding to a high risk of collision. In some embodiments, block 830 may include using a result of the analysis performed at block 820.

At block 830, if it is determined that no obstacle is present in a high risk sector, then the process continues at block 810.

At block 830, if it is determined that an obstacle is present, then the process continues at block 840.

At block 840, acceleration of a mobility apparatus is controlled. The acceleration of the mobility apparatus 105 may be controlled using the drive controller 110, as described elsewhere herein. The acceleration of the mobility apparatus may be controlled based on a control instruction generated based on the analysis of the sensor data at block 820 and/or as a result of the determination at block 830. In some embodiments, controlling the acceleration of the mobility apparatus may include applying brakes of the mobility apparatus, releasing brakes of the mobility apparatus, engaging throttle of the mobility apparatus, and/or disengaging a throttle of the mobility apparatus.

In various embodiments, the process 800 may include more or fewer blocks than those just escribed. For example, the process 800 may include the remote sensor 120 transmitting sensor data to the computing device 130. As another example, the process 800 may include the computing device filtering the sensor data received from the remote sensor 120. In such embodiments, the computing module 130 may perform the data analysis of block 820 using the filtered sensor data. As another example, the process 800 may include the computing device filtering an output of the processing at block 820.

Figure 9A:
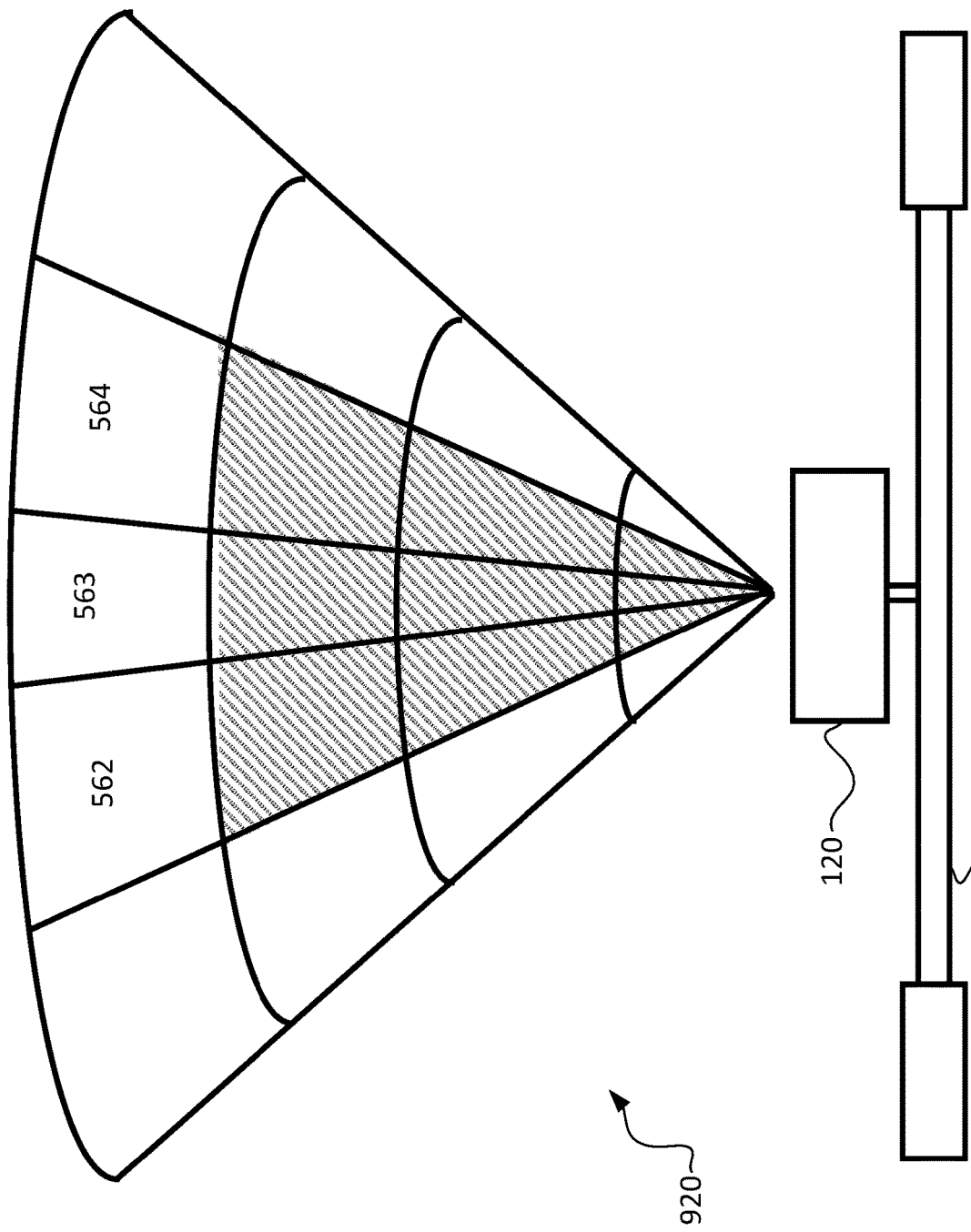
FIG. 9A is a schematic diagram of remote sensing for a mobility apparatus according to some embodiments of the present disclosure.

FIG. 9A is a schematic diagram of remote sensing 920 for a mobility apparatus according to some embodiments of the present disclosure. Remote sensing 920 may be provided as described elsewhere herein.

As illustrated, remote sensing 920 may include a classification or categorization of one or more of the sectors. The classification or categorization may be provided as disclosed elsewhere herein. For instance, the remote sensing 920 may identify a "low risk" category for some sectors, and a "high risk" category for other sectors, as disclosed elsewhere herein. Remote sensing 920 may use other categories or classes for sectors in various embodiments.

As illustrated, remote sensing 920 may apply classifications or categories to sectors differently than disclosed elsewhere herein. For instance, remote sensing 920 may categorize as "high risk" sectors that are close to, and centered in front of, the mobility apparatus 105. In this embodiment, remote sensing 920 may not categorize sector 562, sector 563, or sector 564 as "high risk." For example, even though sectors 562, 563, and 564 are centered in front of the mobility apparatus 105, sectors 562, 563, and 564 are not as close to the mobility apparatus 105, relative to other sectors. Remote sensing 920 may apply these or other categorizations as the result of an artificial intelligence algorithm, such as by training a classification tree structure using decision parameters of centrality and distance. Remote sensing 920 may use a multi-parameter decision tree structure based on different parameters in some embodiments. Remote sensing 920 may use a different multi-parameter structure in some embodiments. Remote sensing 920 may use an artificial neural network in some embodiments.

Figure 9B:
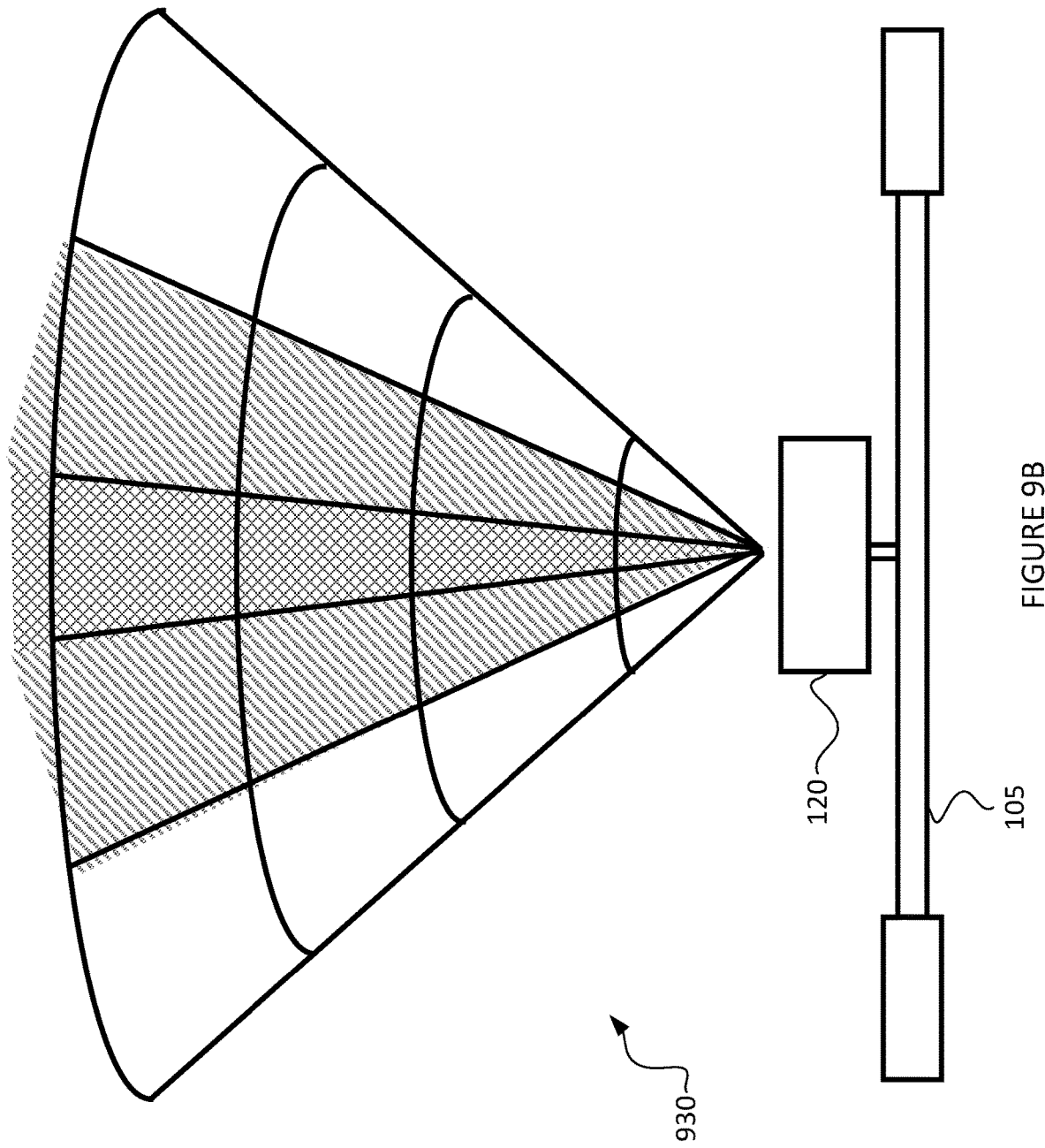
FIG. 9B is a schematic diagram of remote sensing for a mobility apparatus according to some embodiments of the present disclosure.

FIG. 9B is a schematic diagram of remote sensing 930 for a mobility apparatus according to some embodiments of the present disclosure. Remote sensing 930 may be provided as described elsewhere herein.

As illustrated, remote sensing 930 may include a classification or categorization of one or more of the sectors. The classification or categorization may be provided as disclosed elsewhere herein. For instance, the remote sensing 930 may categorize sectors based on level of risk that the mobility apparatus 105 will collide with an obstacle in that sector.

As illustrated, remote sensing 930 may apply more than two classes or categories to the sectors. For example, remote sensing 930 may apply a "high risk" category (illustrated with cross-hatching) to some sectors, a "medium risk" category (illustrated in hatching) to some sectors, and a "low risk" category (illustrated without hatching) to some sectors. The remote sensing 930 may apply the more than two classes or categories to indicate a gradient of risk that an obstacle in the various sectors will result in a collision with the mobility apparatus 105.

Remote sensing 930 may apply these or other categorizations as the result of an artificial intelligence algorithm, such as by training a classification tree structure using decision parameters of centrality and distance. Remote sensing 930 may use a multi-parameter decision tree structure based on different parameters in some embodiments. Remote sensing 930 may use a different multi-parameter structure in some embodiments. Remote sensing 930 may use an artificial neural network in some embodiments.

Figure 9C:
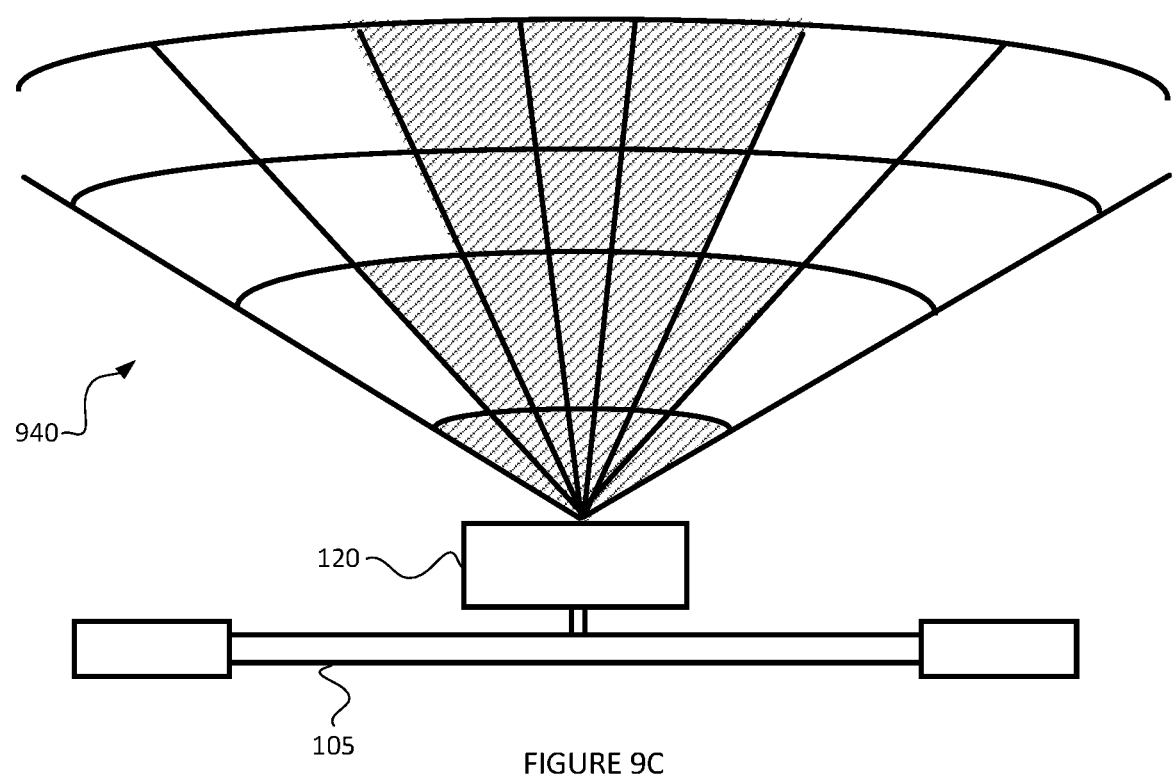
FIG. 9C is a schematic diagram of remote sensing for a mobility apparatus according to some embodiments of the present disclosure.

FIG. 9C is a schematic diagram of remote sensing 940 for a mobility apparatus according to some embodiments of the present disclosure. Remote sensing 940 may be provided as described elsewhere herein.

As illustrated, remote sensing 940 may include a classification or categorization of one or more of the sectors. The classification or categorization may be provided as disclosed elsewhere herein. For instance, the remote sensing 940 may identify a "low risk" category for some sectors, and a "high risk" category for other sectors, as disclosed elsewhere herein. Remote sensing 940 may use other categories or classes for sectors in various embodiments.

As illustrated, remote sensing 940 may apply classifications or categories to sectors differently than disclosed elsewhere herein. For instance, remote sensing 940 may categorize as "high risk" sectors that are close to, and centered in front of, the mobility apparatus 105. Remote sensing 940 may categorize more sectors based on sensor data for a larger area in front of the mobility apparatus 105. Remote sensing 920 may apply these or other categorizations as the result of an artificial intelligence algorithm, such as by training a classification tree structure using decision parameters of centrality and distance. Remote sensing 920 may use a multi-parameter decision tree structure based on different parameters in some embodiments. Remote sensing 920 may use a different multi-parameter structure in some embodiments. Remote sensing 920 may use an artificial neural network in some embodiments.

Figure 9D:
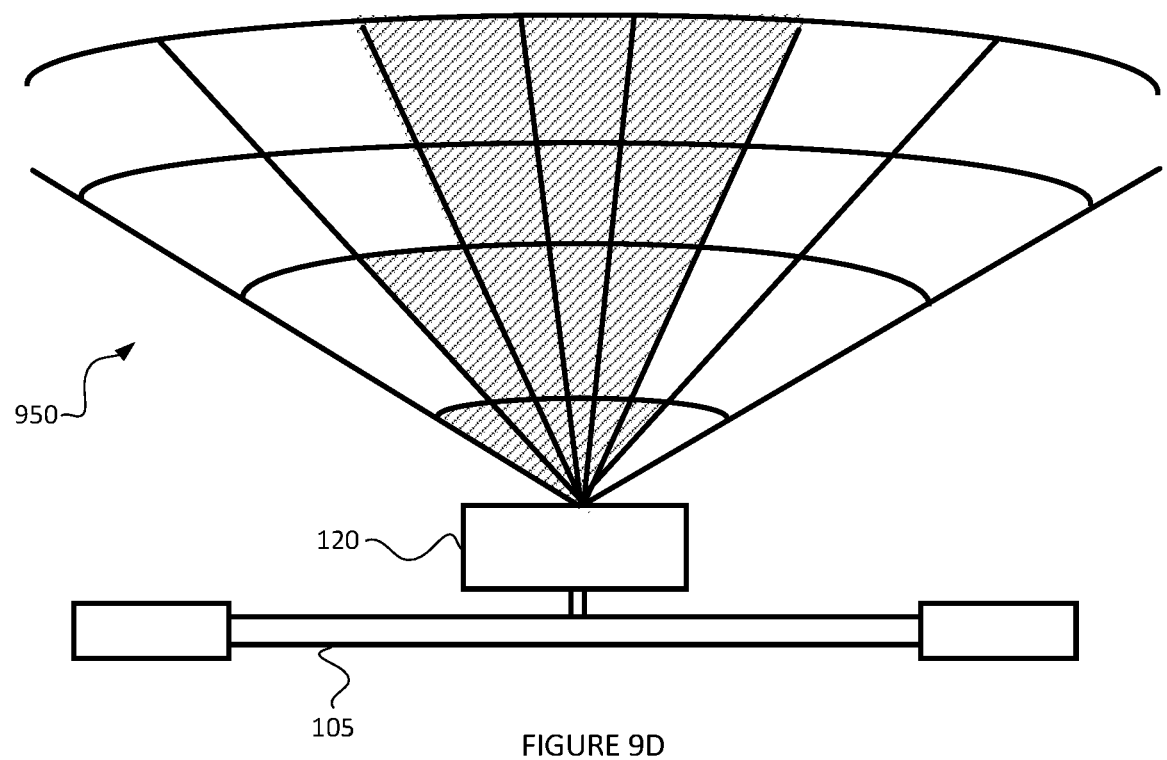
FIG. 9D is a schematic diagram of remote sensing for a mobility apparatus according to some embodiments of the present disclosure.

FIG. 9D is a schematic diagram of remote sensing 950 for a mobility apparatus according to some embodiments of the present disclosure. Remote sensing 950 may be provided as described elsewhere herein.

As illustrated, remote sensing 950 may include a classification or categorization of one or more of the sectors. The classification or categorization may be provided as disclosed elsewhere herein. For instance, the remote sensing 950 may identify a "low risk" category for some sectors, and a "high risk" category for other sectors, as disclosed elsewhere herein. Remote sensing 950 may use other categories or classes for sectors in various embodiments.

As illustrated, remote sensing 950 may apply classifications or categories to sectors differently than disclosed elsewhere herein. For instance, remote sensing 950 may categorize as "high risk" sectors in a way that is not symmetric. For example, remote sensing 950 may categorize as "high risk" sectors without requiring symmetry about the center axis of the mobility device 110. Remote sensing 950 may apply these or other categorizations as the result of an artificial intelligence algorithm, such as by training an artificial neural network based on training data reflecting actual obstacle measurements and collision outcomes. The categorization resulting from the application of the artificial intelligence algorithm may reflect real-world conditions that may not be evident by human observation. For example, the illustration of FIG. 9D may reflect that users of mobility apparatus like mobility apparatus 105 are less likely to notice an obstacle to the user's left and more likely to notice an obstacle to the user's right. Remote sensing 950 may use a different artificial intelligence algorithm in some embodiments.

FIG. 9E is a schematic diagram of remote sensing 960 for a mobility apparatus according to some embodiments of the present disclosure. Remote sensing 960 may be provided as described elsewhere herein.

As illustrated, remote sensing 960 may include more granular sectors (i.e., more sectors per unit of area or volume) than disclosed elsewhere herein. In some embodiments, remote sensing 960 may determine the granularity of the sectors based on the resolution of the remote sensor 120. This determination may be made by, for example, computing module 130. In some embodiments, remote sensing 960 may determine the granularity of the sectors dynamically, while the mobility apparatus is in operation. This determination may be made by, for example, computing module 130. In some embodiments, remote sensing 960 may determine the granularity of the sectors dynamically based on the environment in which the mobility apparatus 105 is present. For example, remote sensing 960 may determine to use more granular sectors based on determining that the mobility apparatus is in a confined environment, such as a sidewalk (e.g., by determine the frequency of obstacles in the range of detection). As an example, remote sensing 960 may determine to use less granular sectors based on determining that the mobility apparatus is in an open environment, such as a bike lane (e.g., by determine the frequency of obstacles in the range of detection). This determination may be made by, for example, computing module 130.

The remote sensing 920, remote sensing 930, remote sensing 940, remote sensing 950, and remote sensing 960 may be using in combination with other aspects of the present disclosure. For example, the granularity of sectors described with respect to remote sensing 960 may be combined with the asymmetrical categorization described with respect to remote sensing 950. As another example, the processes 700 and 800 may be used in combination with remote sensing 920, remote sensing 930, remote sensing 940, remote sensing 950, and/or remote sensing 960.

Figure 10:
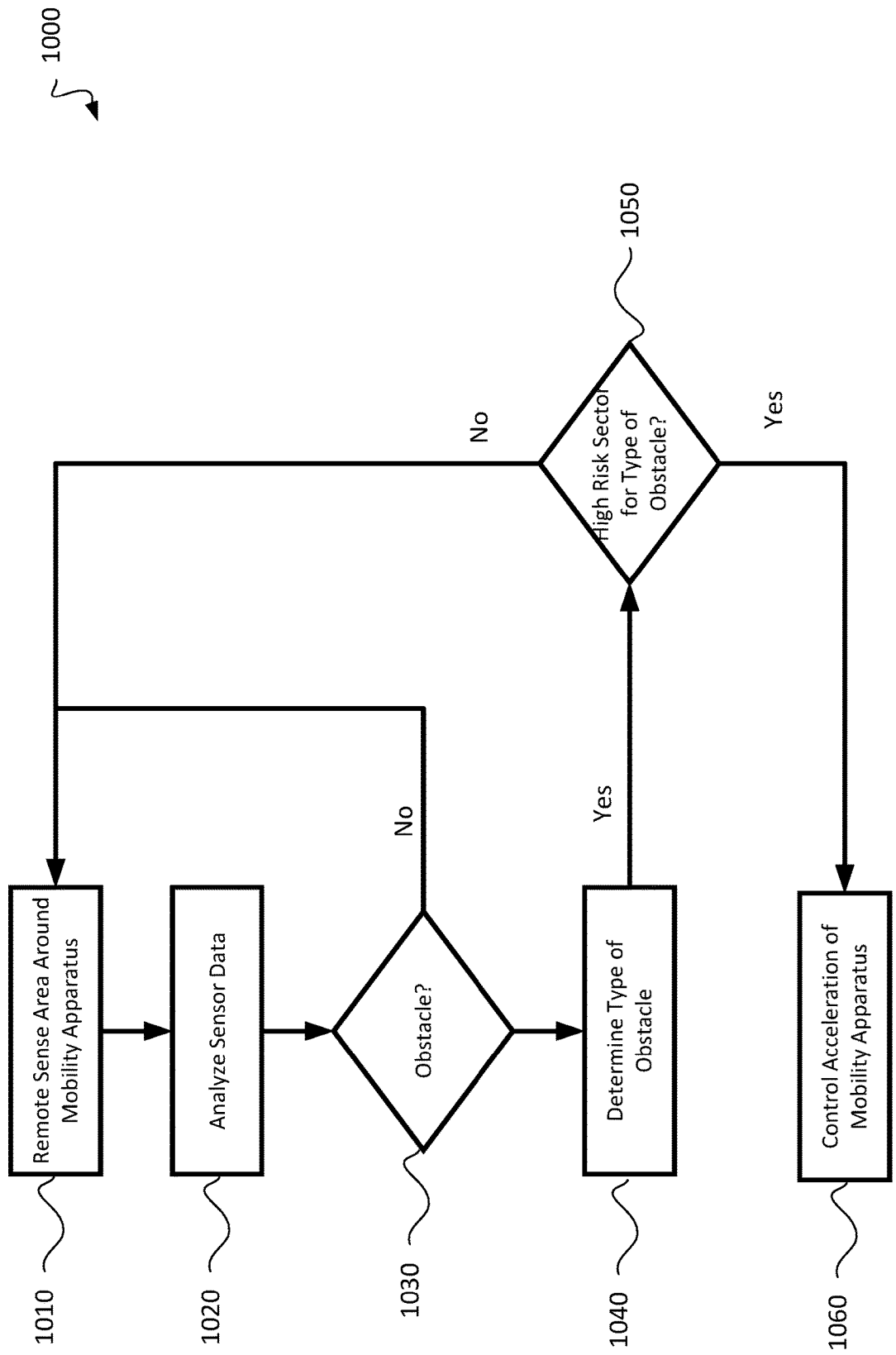
FIG. 10 is a flowchart for a process of controlling a mobility apparatus according to some embodiments of the present disclosure.

FIG. 10 is a flowchart for a process 1000 of controlling a mobility apparatus according to some embodiments of the present disclosure. The process 1000 may be performed using the mobility system 100 in some embodiments.

At block 1010, remote sensing is performed in the area around a mobility apparatus. The remote sensing may include using a remote sensor 120, as described elsewhere herein. The remote sensing may include sensing an area in front of the mobility apparatus 105 using millimeter wave radar.

At block 1020, sensor data is analyzed. The data analysis may include using a computing module 130 to process sensor data captured by the remote sensor 120, as described elsewhere herein. In some embodiments, the data analysis may be performed by other components, such as image processor 330, as described elsewhere herein.

The data analysis of block 1020 may include analyzing sensor data to determine whether an obstacle is present in the area around the mobility apparatus. For example, the data analysis may include determining whether an obstacle is present in one or more sectors sensed by the remote sensor 120 in front of the mobility apparatus 105. The data analysis of block 1020 may include applying a decision tree structure or other previously-trained structure.

At block 1030, a determination is made as to whether there is an obstacle. For example, a determination may be made as to whether an obstacle is present in one or more sectors sensed by the remote sensor 120 in front of the mobility apparatus 105. In some embodiments, block 1030 may include using a result of the analysis performed at block 1020.

At block 1030, if it is determined that no obstacle is present, then the process continues at block 1010.

At block 1030, if it is determined that an obstacle is present, then the process continues at block 1040.

At block 1040, a determination is made as to the type of obstacle. The determination may be made by computing module 130 in some embodiments. The determination may include classifying the detected obstacle into one or more predetermined categories. For example, a determination may be made as to whether the obstacle is a pedestrian, a telephone pole, an automobile, or a bicycle. As another example, a determination may be made as to whether the obstacle is a stationary obstacle or mobile obstacle. The determination of the type of obstacle may be performed using the sensor data captured by the remote sensor 120. The determination may be performed based on an artificial intelligence algorithm, such as by using a neural network structure trained using past sensor data for known types of obstacles.

At block 1050, a determination is made as to whether the sector the obstacle is present in is a high risk sector based on the type of obstacle. The determination may be made by computing module 130 in some embodiments. For example, the determination may include determining that, for an obstacle detected in sector 552 (with reference to FIG. 5), that that is not a high risk sector based on block 1040 resulting in a determination that obstacle is a stationary obstacle (e.g., a telephone pole in sector 552 is not a high risk of collision, because it is unlikely to move). As another example, the determination may include determining that, for an obstacle detected in sector 552 (with reference to FIG. 5), that that is a high risk sector based on block 1040 resulting in a determination that obstacle is a mobile obstacle (e.g., a pedestrian in sector 552 is a high risk of collision, because it is likely to move).

The determination at block 1050 may be performed in a variety of ways. The determination at block 1050 may be performed based on performed using a neural network structure trained using past sensor data and actual collision outcomes. The determination may be performed using a set of predetermined rules, based on the parameters of obstacle type and obstacle location. The determination may be performed using a predefined continuous value function, based on input parameters of obstacle type and obstacle location. The determination may be performed using a predefined discrete value function, based on input parameters of obstacle type and obstacle location. The determination at block 1050 may be performed in other ways in various embodiments.

In some embodiments, the process 1000 may include an additional block of determining the sector in which the obstacle is located. In other embodiments, this determination may be performed as part of block 1020, 1040, and/or 1050.

At block 1050, if it is determined that the obstacle is not in a high risk sector based on the type of obstacle, then the process continues at block 1010.

At block 1050, if it is determined that the obstacle is in a high risk sector based on the type of obstacle, then the process continues at block 1060.

At block 1060, acceleration of a mobility apparatus is controlled. The acceleration of the mobility apparatus 105 may be controlled using the drive controller 110, as described elsewhere herein. The acceleration of the mobility apparatus may be controlled based on a control instruction generated based on the analysis of the sensor data at block 1020 and/or as a result of the determination at block 1050. In some embodiments, controlling the acceleration of the mobility apparatus may include applying brakes of the mobility apparatus, releasing brakes of the mobility apparatus, engaging throttle of the mobility apparatus, and/or disengaging a throttle of the mobility apparatus.

In various embodiments, the process 1000 may include more or fewer blocks than those just escribed. For example, the process 1000 may include the remote sensor 120 transmitting sensor data to the computing device 130. As another example, the process 1000 may include the computing device filtering the sensor data received from the remote sensor 120. In such embodiments, the computing module 130 may perform the data analysis of block 1020 using the filtered sensor data. As another example, the process 1000 may include the computing device filtering an output of the processing at block 1020.

Figure 11:
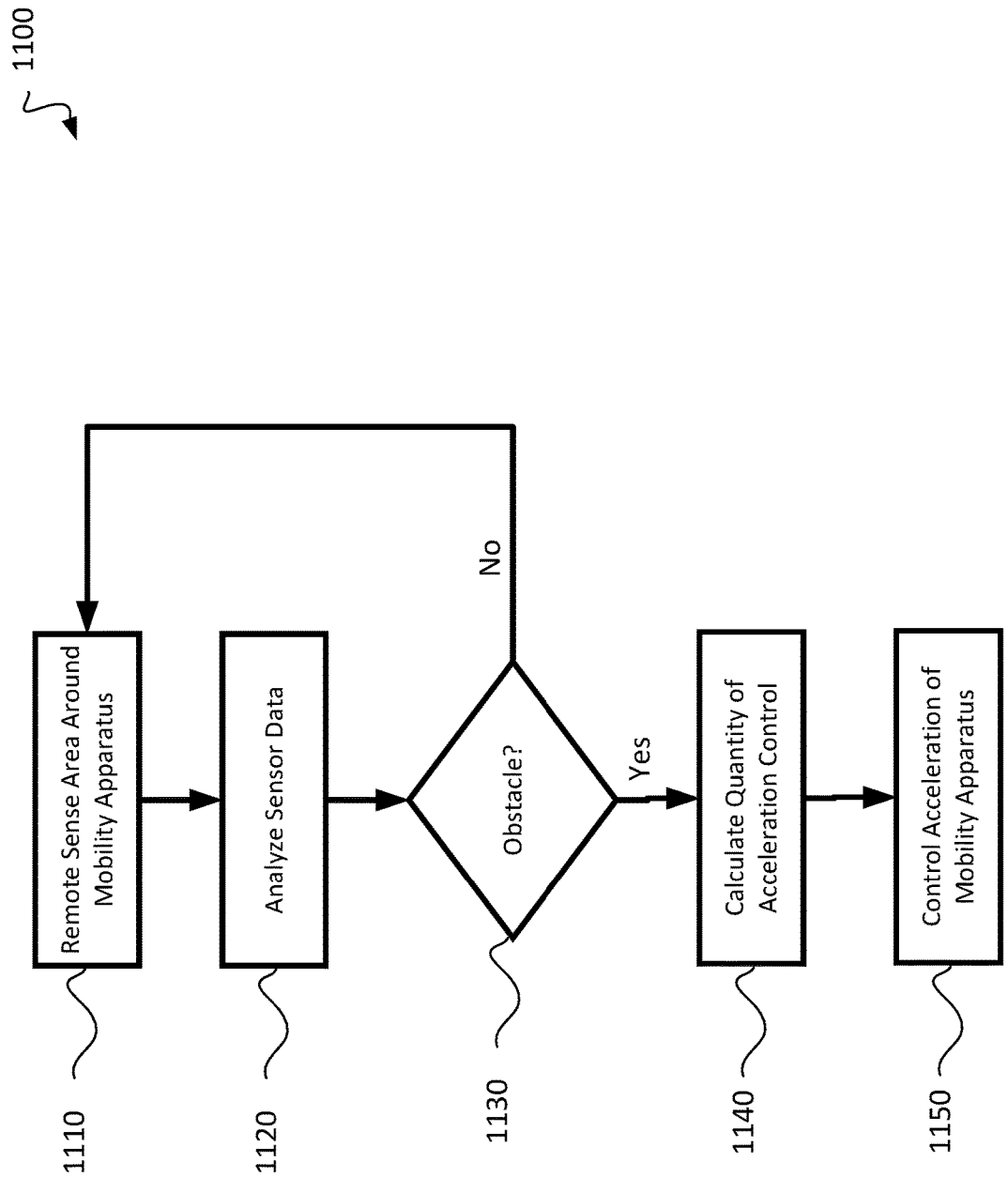
FIG. 11 is a flowchart for a process of controlling a mobility apparatus according to some embodiments of the present disclosure.

FIG. 11 is a flowchart for a process 1100 of controlling a mobility apparatus according to some embodiments of the present disclosure. The process 1100 may be performed using the mobility system 100 in some embodiments.

At block 1110, remote sensing is performed in the area around a mobility apparatus. The remote sensing may include using a remote sensor 120, as described elsewhere herein. The remote sensing may include sensing an area in front of the mobility apparatus 105 using millimeter wave radar.

At block 1120, sensor data is analyzed. The data analysis may include using a computing module 130 to process sensor data captured by the remote sensor 120, as described elsewhere herein. In some embodiments, the data analysis may be performed by other components, such as image processor 330, as described elsewhere herein.

The data analysis of block 1120 may include analyzing sensor data to determine whether an obstacle is present in the area around the mobility apparatus. For example, the data analysis may include determining whether an obstacle is present in one or more sectors sensed by the remote sensor 120 in front of the mobility apparatus 105. The data analysis of block 1120 may include applying a decision tree structure or other previously-trained structure.

At block 1130, a determination is made as to whether there is an obstacle. For example, a determination may be made as to whether an obstacle is present in one or more sectors sensed by the remote sensor 120 in front of the mobility apparatus 105. In some embodiments, block 1130 may include using a result of the analysis performed at block 1120.

At block 1130, if it is determined that no obstacle is present, then the process continues at block 1110.

At block 1130, if it is determined that an obstacle is present, then the process continues at block 1140.

At block 1140, a quantity of acceleration control is calculated. The calculation may be made by computing module 130 in some embodiments. The calculation may be made by drive controller 110 in some embodiments.

The calculation at block 1140 may include calculating an amount of velocity change to apply to the mobility apparatus 105. For example, block 1140 may include calculating an amount of adjustment to a throttle of the mobility apparatus 105. As another example, block 1140 may include calculating an amount of braking to apply using a brake of the mobility apparatus 105.

In some embodiment, the calculation at block 1140 may be performed based on one or more parameters. For example, the calculation may be performed based on the sector in which the obstacle is present (e.g., more braking for an obstacle in sector 542 than for an obstacle in sector 562 (with reference to FIG. 5)). As another example, the calculation may be performed based on the type of obstacle (e.g., more braking for a mobile obstacle than for a stationary obstacle). As another example, the calculation may be performed based on a combination of the sector in which the obstacle is present and the type of obstacle (e.g., more braking for a stationary obstacle in sector 533 than for a mobile obstacle in sector 552 (with reference to FIG. 5)). The calculation of block 1140 may be performed based on other parameters in various embodiments. In some embodiments, the calculation of block 1140 may be performed based on an artificial intelligence structure, such as a decision tree structure or an artificial neural network structure.

At block 1150, acceleration of a mobility apparatus is controlled. The acceleration of the mobility apparatus 105 may be controlled using the drive controller 110, as described elsewhere herein. The acceleration of the mobility apparatus may be performed based on the calculation performed at block 1140. The acceleration of the mobility apparatus may be controlled based on a control instruction generated based on the calculation performed at block 1140. In some embodiments, controlling the acceleration of the mobility apparatus may include applying brakes of the mobility apparatus, releasing brakes of the mobility apparatus, engaging throttle of the mobility apparatus, and/or disengaging a throttle of the mobility apparatus.

In various embodiments, the process 1100 may include more or fewer blocks than those just escribed. For example, the process 1100 may include the remote sensor 120 transmitting sensor data to the computing device 130. As another example, the process 1100 may include the computing device filtering the sensor data received from the remote sensor 120. In such embodiments, the computing module 130 may perform the data analysis of block 1120 using the filtered sensor data. As another example, the process 1100 may include the computing device filtering an output of the processing at block 1120.

Figure 12:
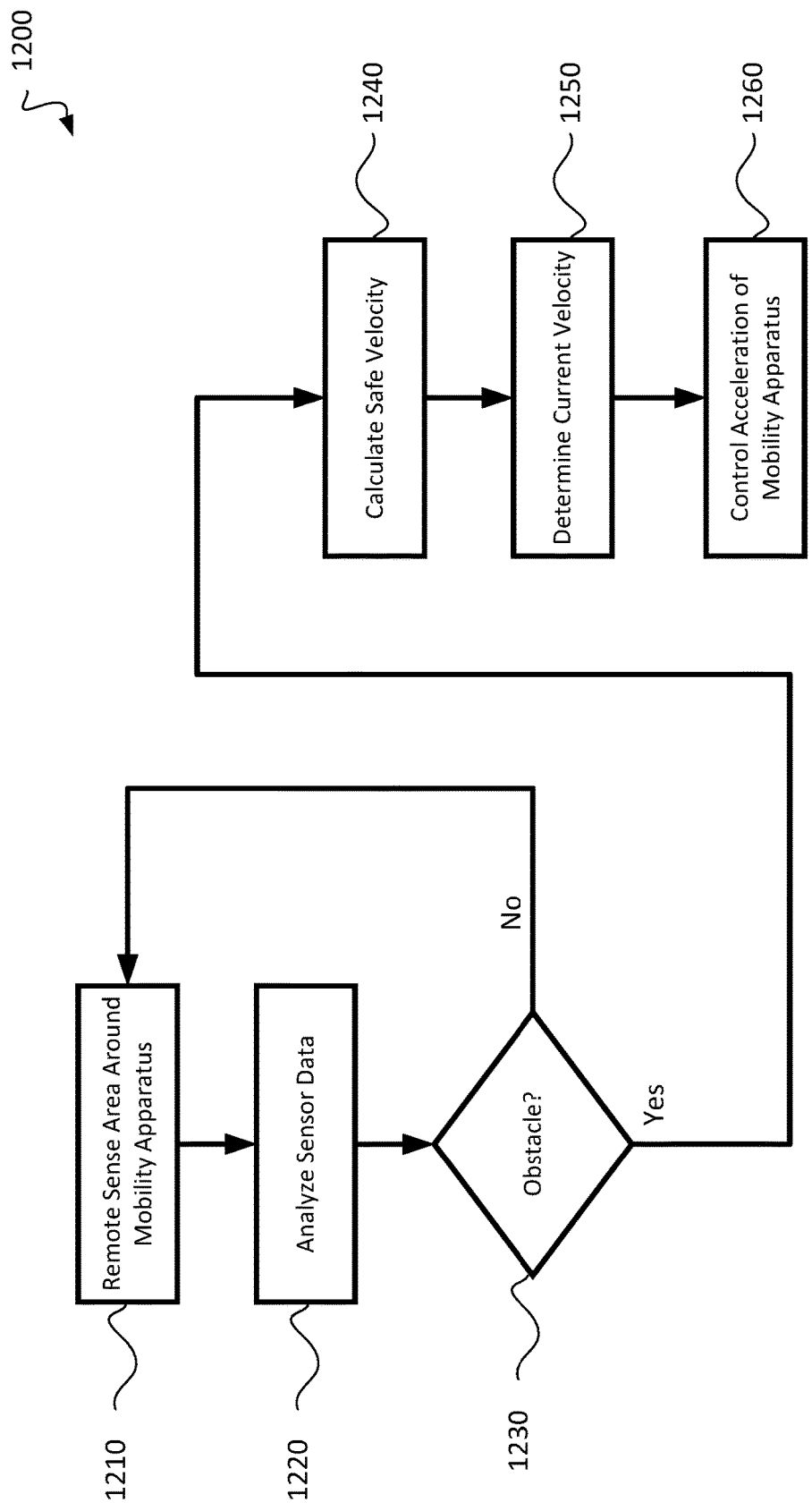
FIG. 12 is a flowchart for a process of controlling a mobility apparatus according to some embodiments of the present disclosure.

FIG. 12 is a flowchart for a process 1200 of controlling a mobility apparatus according to some embodiments of the present disclosure. The process 1200 may be performed using the mobility system 100 in some embodiments.

At block 1210, remote sensing is performed in the area around a mobility apparatus. The remote sensing may include using a remote sensor 120, as described elsewhere herein. The remote sensing may include sensing an area in front of the mobility apparatus 105 using millimeter wave radar.

At block 1220, sensor data is analyzed. The data analysis may include using a computing module 130 to process sensor data captured by the remote sensor 120, as described elsewhere herein. In some embodiments, the data analysis may be performed by other components, such as image processor 330, as described elsewhere herein.

The data analysis of block 1220 may include analyzing sensor data to determine whether an obstacle is present in the area around the mobility apparatus. For example, the data analysis may include determining whether an obstacle is present in one or more sectors sensed by the remote sensor 120 in front of the mobility apparatus 105. The data analysis of block 1220 may include applying a decision tree structure or other previously-trained structure.

At block 1230, a determination is made as to whether there is an obstacle. For example, a determination may be made as to whether an obstacle is present in one or more sectors sensed by the remote sensor 120 in front of the mobility apparatus 105. In some embodiments, block 1230 may include using a result of the analysis performed at block 1220.

At block 1230, if it is determined that no obstacle is present, then the process continues at block 1210.

At block 1230, if it is determined that an obstacle is present, then the process continues at block 1240.

At block 1240, a safe velocity is calculated. The calculation may be made by computing module 130 in some embodiments. The calculation may be made by drive controller 110 in some embodiments.

The calculation at block 1240 may include calculating a velocity for the mobility apparatus that will avoid a collision with the obstacle. For example, the calculation may include determining whether increasing velocity or decreasing velocity is more likely to avoid a collision. The determination may be made based on determining a trajectory for the mobility apparatus. As another example, the calculation may include determining a maximum velocity that will reduce the force imparted on the user of the mobility apparatus below a predetermined threshold should a collision occur (e.g., determine the highest velocity that the mobility apparatus can still be traveling while reducing collision impact to at most 1 G). The calculation at block 1240 may be performed in different ways in various embodiments. In some embodiments, the calculation may be performed based on a an artificial intelligence structure.

At block 1250, a current velocity is determined. The calculation may be made by computing module 130 in some embodiments. The calculation may be made by drive controller 110 in some embodiments.

The calculation at block 1250 may be performed in a variety of ways. For example, the drive controller 110 may calculate a current velocity of the mobility apparatus based on a measured number of revolutions per minute of the rear wheel of the mobility apparatus. As another example, the computing module 130 may calculate a current velocity of the mobility apparatus based on a global positioning system receiver present on the mobility apparatus. The calculation may be performed in other ways in various embodiments.

At block 1260, acceleration of a mobility apparatus is controlled. The acceleration of the mobility apparatus 105 may be controlled using the drive controller 110, as described elsewhere herein. The acceleration of the mobility apparatus may be performed based on the calculation performed at block 1240 and/or 1250. The acceleration of the mobility apparatus may be controlled based on a control instruction generated based on the calculation performed at block 1240 and/or 1250. The acceleration of the mobility apparatus may be controlled based on a difference value between the safe velocity calculated at block 1240 and the current velocity determined at block 1250. In some embodiments, controlling the acceleration of the mobility apparatus may include applying brakes of the mobility apparatus, releasing brakes of the mobility apparatus, engaging throttle of the mobility apparatus, and/or disengaging a throttle of the mobility apparatus.

In various embodiments, the process 1200 may include more or fewer blocks than those just escribed. For example, the process 1200 may include the remote sensor 120 transmitting sensor data to the computing device 130. As another example, the process 1200 may include the computing device filtering the sensor data received from the remote sensor 120. In such embodiments, the computing module 130 may perform the data analysis of block 1220 using the filtered sensor data. As another example, the process 1200 may include the computing device filtering an output of the processing at block 1220.

Figure 13A:
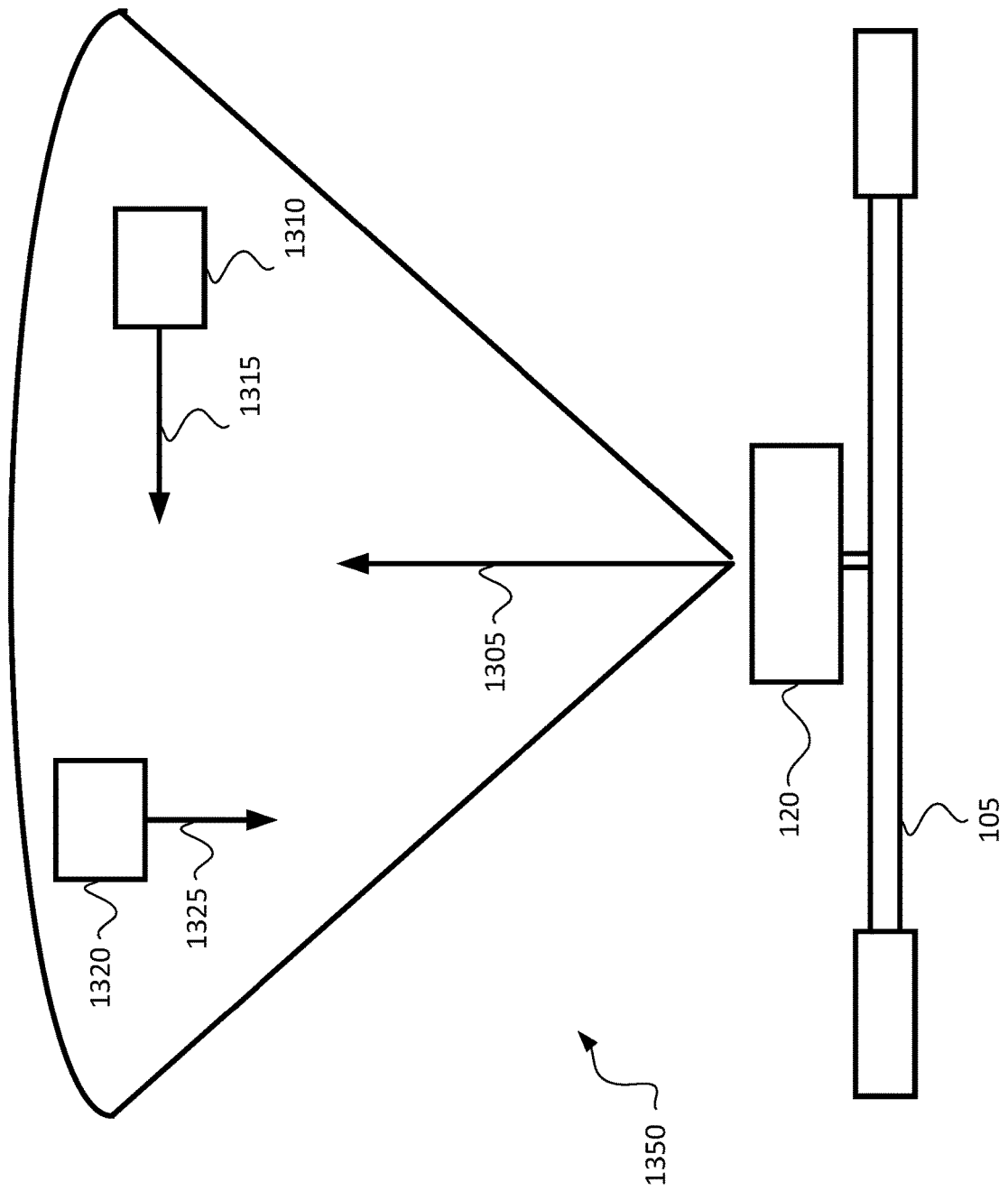
FIG. 13A is a schematic diagram of remote sensing for a mobility apparatus according to some embodiments of the present disclosure.

FIG. 13A is a schematic diagram of remote sensing 1350 for a mobility apparatus according to some embodiments of the present disclosure. Remote sensing 1350 may be provided as described elsewhere herein. The mobility apparatus may be moving according to a trajectory 1305.

Remote sensing 1350 may include detecting the presence of obstacle 1310 in the area in front of the mobility apparatus 105. The obstacle 1310 may be moving according to a trajectory 1315.

Remote sensing 1350 may include detecting the presence of obstacle 1320 in the area in front of the mobility apparatus 105. The obstacle 1320 may be moving according to a trajectory 1305.

Figure 13B:
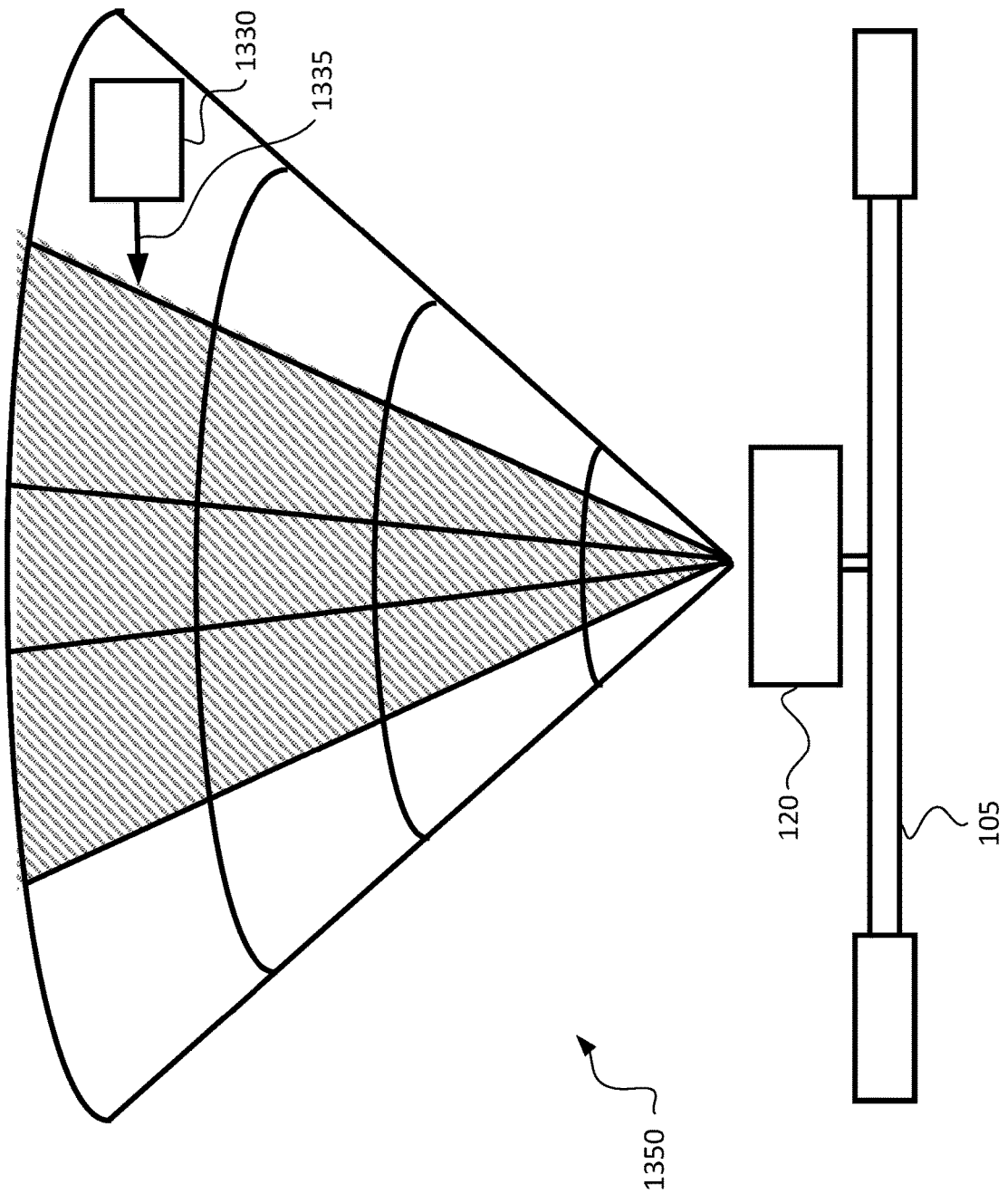
FIG. 13B is a schematic diagram of remote sensing for a mobility apparatus according to some embodiments of the present disclosure.

FIG. 13B is a schematic diagram of remote sensing 1350 for a mobility apparatus according to some embodiments of the present disclosure. Remote sensing 1350 may be provided as described elsewhere herein. Remote sensing 1350 may include categorization of sectors as described elsewhere herein.

Remote sensing 1350 may include detecting the presence of obstacle 1330 in the area in front of the mobility apparatus 105. The obstacle 1330 may be moving according to a trajectory 1335. Remote sensing 1350 may include detecting the trajectory 1335 with respect to the various sectors in the remote sensing 1350. Remote sensing 1350 may include detecting the trajectory 1335 with respect to the categories or classes of sectors in remote sensing 1350.

Figure 14:
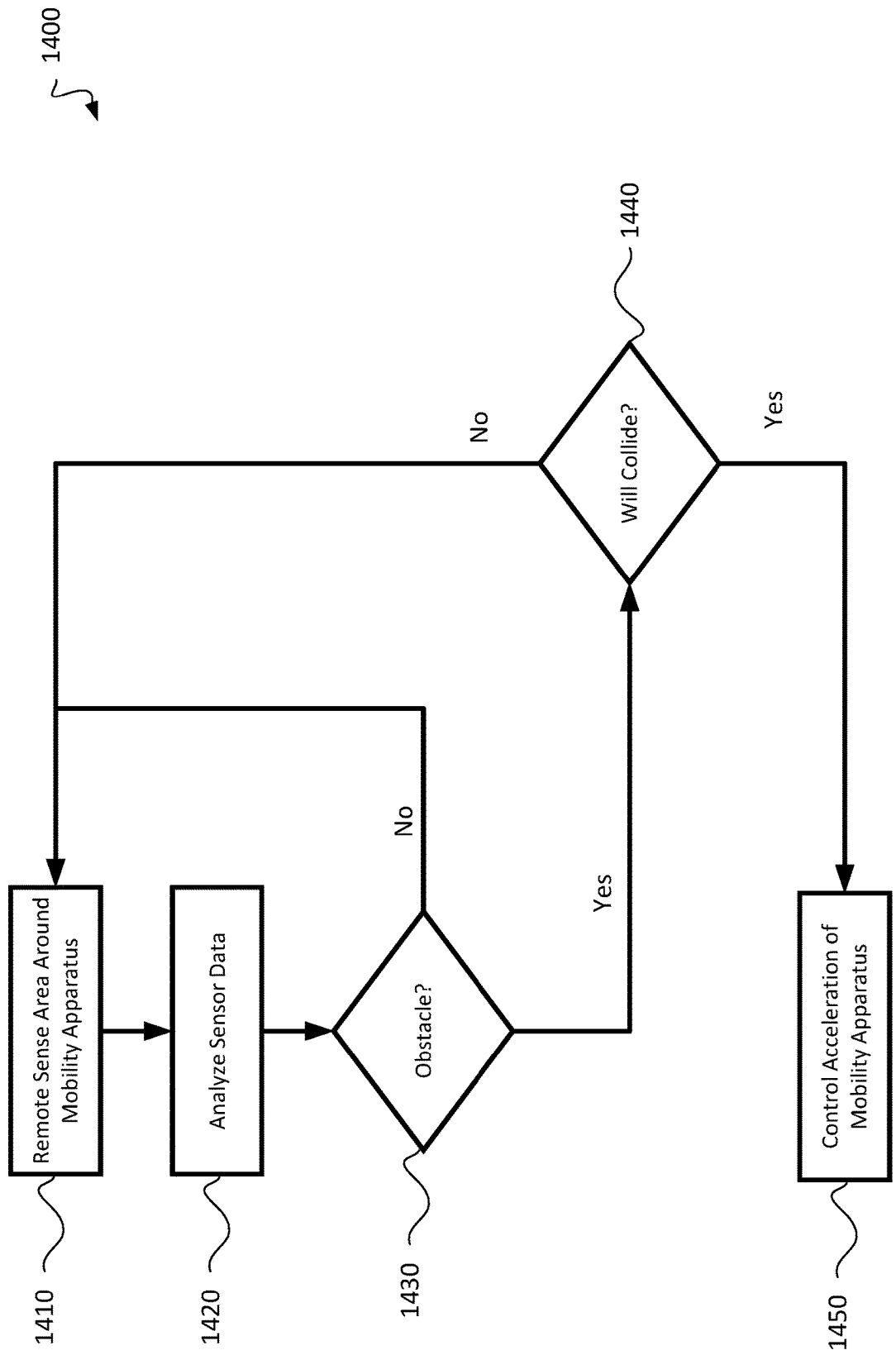
FIG. 14 is a flowchart for a process of controlling a mobility apparatus according to some embodiments of the present disclosure.

FIG. 14 is a flowchart for a process 1400 of controlling a mobility apparatus according to some embodiments of the present disclosure. The process 1400 may be performed using the mobility system 100 in some embodiments.

At block 1410, remote sensing is performed in the area around a mobility apparatus. The remote sensing may include using a remote sensor 120, as described elsewhere herein. The remote sensing may include sensing an area in front of the mobility apparatus 105 using millimeter wave radar.

At block 1420, sensor data is analyzed. The data analysis may include using a computing module 130 to process sensor data captured by the remote sensor 120, as described elsewhere herein. In some embodiments, the data analysis may be performed by other components, such as image processor 330, as described elsewhere herein.

The data analysis of block 1420 may include analyzing sensor data to determine whether an obstacle is present in the area around the mobility apparatus. For example, the data analysis may include determining whether an obstacle is present in one or more sectors sensed by the remote sensor 120 in front of the mobility apparatus 105. The data analysis of block 1420 may include applying a decision tree structure or other previously-trained structure.

At block 1430, a determination is made as to whether there is an obstacle. For example, a determination may be made as to whether an obstacle is present in one or more sectors sensed by the remote sensor 120 in front of the mobility apparatus 105. In some embodiments, block 1430 may include using a result of the analysis performed at block 1420.

At block 1430, if it is determined that no obstacle is present, then the process continues at block 1410.

At block 1430, if it is determined that an obstacle is present, then the process continues at block 1440.

At block 1440, a determination is made as to whether the mobility apparatus 105 will collide with the obstacle. The determination may be made by computing module 130 in some embodiments.

The determination at block 1440 may be made in various ways. For example, the determination may be made by calculating a trajectory of the obstacle (e.g., trajectory 1315 (with reference to FIG. 13A), calculating a trajectory of the mobility apparatus 105 (e.g., trajectory 1305 (with reference to FIG. 13A)), and comparing the trajectories to determine if they will intersect. As another example, the determination may be made by determining if the whether the obstacle will come within a predefined minimum radius of the mobility apparatus 105. The determination may be made in other ways in various embodiments.

At block 1440, if it is determined that the mobility apparatus will not collide with the obstacle, then the process continues at block 1410.

At block 1440, if it is determined that the mobility apparatus will collide with the obstacle, then the process continues at block 1450.

At block 1450, acceleration of a mobility apparatus is controlled. The acceleration of the mobility apparatus 105 may be controlled using the drive controller 110, as described elsewhere herein. The acceleration of the mobility apparatus may be performed based on the determination performed at block 1440. The acceleration of the mobility apparatus may be controlled based on a control instruction generated based on the determination performed at block 1440. In some embodiments, controlling the acceleration of the mobility apparatus may include applying brakes of the mobility apparatus, releasing brakes of the mobility apparatus, engaging throttle of the mobility apparatus, and/or disengaging a throttle of the mobility apparatus.

In various embodiments, the process 1400 may include more or fewer blocks than those just escribed. For example, the process 1400 may include the remote sensor 120 transmitting sensor data to the computing device 130. As another example, the process 1400 may include the computing device filtering the sensor data received from the remote sensor 120. In such embodiments, the computing module 130 may perform the data analysis of block 1420 using the filtered sensor data. As another example, the process 1400 may include the computing device filtering an output of the processing at block 1420.

Figure 15:
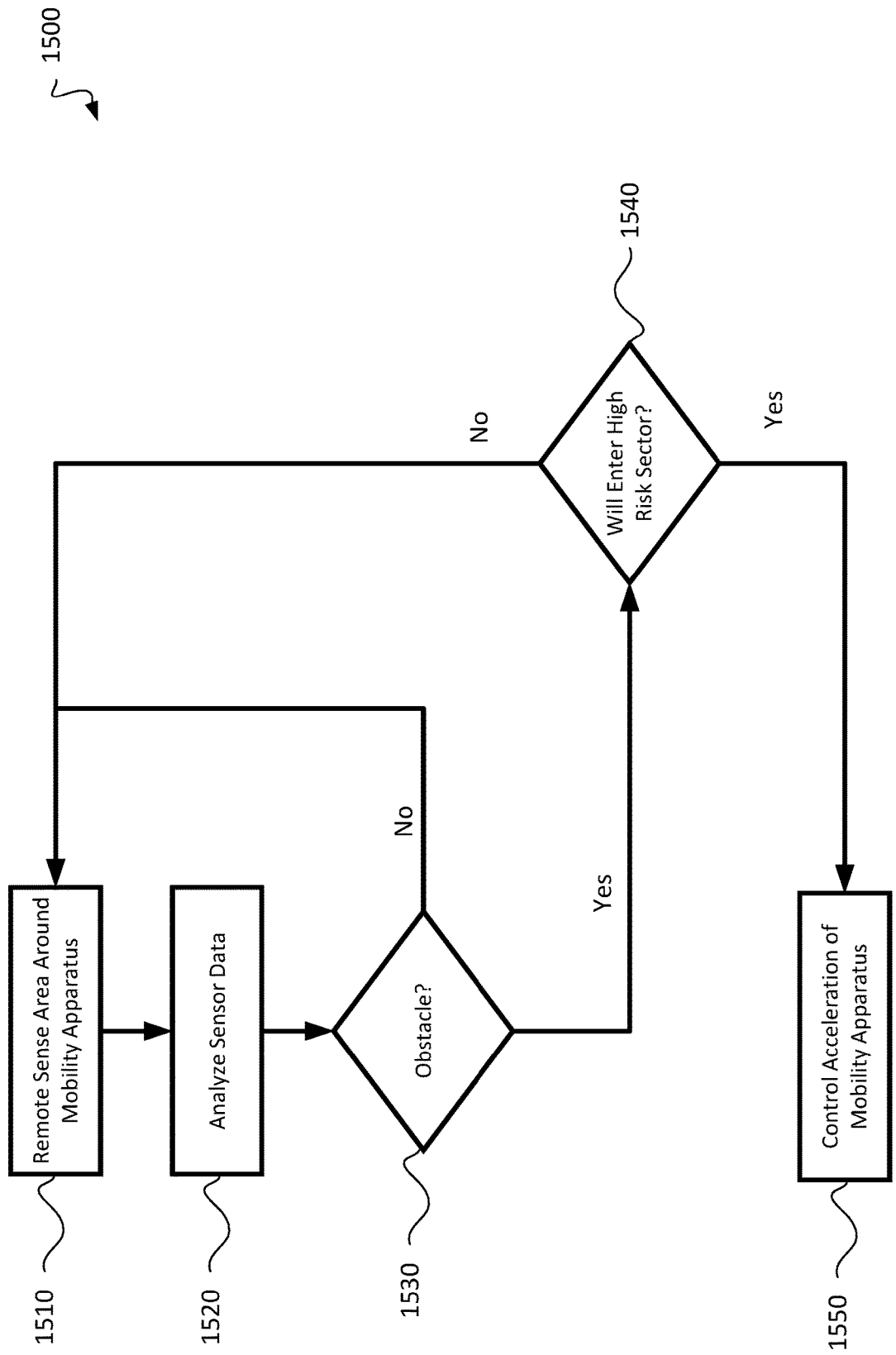
FIG. 15 is a flowchart for a process of controlling a mobility apparatus according to some embodiments of the present disclosure.

FIG. 15 is a flowchart for a process 1500 of controlling a mobility apparatus according to some embodiments of the present disclosure. The process 1500 may be performed using the mobility system 100 in some embodiments.

At block 1510, remote sensing is performed in the area around a mobility apparatus. The remote sensing may include using a remote sensor 120, as described elsewhere herein. The remote sensing may include sensing an area in front of the mobility apparatus 105 using millimeter wave radar.

At block 1520, sensor data is analyzed. The data analysis may include using a computing module 130 to process sensor data captured by the remote sensor 120, as described elsewhere herein. In some embodiments, the data analysis may be performed by other components, such as image processor 330, as described elsewhere herein.

The data analysis of block 1520 may include analyzing sensor data to determine whether an obstacle is present in the area around the mobility apparatus. For example, the data analysis may include determining whether an obstacle is present in one or more sectors sensed by the remote sensor 120 in front of the mobility apparatus 105. The data analysis of block 1520 may include applying a decision tree structure or other previously-trained structure.

At block 1530, a determination is made as to whether there is an obstacle. For example, a determination may be made as to whether an obstacle is present in one or more sectors sensed by the remote sensor 120 in front of the mobility apparatus 105. In some embodiments, block 1530 may include using a result of the analysis performed at block 1520.

At block 1530, if it is determined that no obstacle is present, then the process continues at block 1510.

At block 1530, if it is determined that an obstacle is present, then the process continues at block 1540.

At block 1540, a determination is made as to whether the obstacle will enter a high risk sector. The determination may be made by computing module 130 in some embodiments.

The determination at block 1540 may be made in various ways. For example, the determination may be made by calculating a trajectory of the obstacle (e.g., trajectory 1335 (with reference to FIG. 13B), and comparing the trajectory to the present location of sectors categorized as high risk. As another example, the determination may be made by calculating a trajectory of the obstacle (e.g., trajectory 1335 (with reference to FIG. 13B), and comparing the trajectory to expected future locations of sectors categorized as high risk. The expected future locations of the sectors may be determined based on determining a trajectory of the mobility apparatus 105 (e.g., trajectory 1305 (with reference to FIG. 13A)).

At block 1540, if it is determined that the obstacle will not enter a high risk sector, then the process continues at block 1510.

At block 1540, if it is determined that the obstacle will enter a high risk sector, then the process continues at block 1550.

At block 1550, acceleration of a mobility apparatus is controlled. The acceleration of the mobility apparatus 105 may be controlled using the drive controller 110, as described elsewhere herein. The acceleration of the mobility apparatus may be performed based on the determination performed at block 1540. The acceleration of the mobility apparatus may be controlled based on a control instruction generated based on the determination performed at block 1540. In some embodiments, controlling the acceleration of the mobility apparatus may include applying brakes of the mobility apparatus, releasing brakes of the mobility apparatus, engaging throttle of the mobility apparatus, and/or disengaging a throttle of the mobility apparatus.

In various embodiments, the process 1500 may include more or fewer blocks than those just escribed. For example, the process 1500 may include the remote sensor 120 transmitting sensor data to the computing device 130. As another example, the process 1500 may include the computing device filtering the sensor data received from the remote sensor 120. In such embodiments, the computing module 130 may perform the data analysis of block 1520 using the filtered sensor data. As another example, the process 1500 may include the computing device filtering an output of the processing at block 1520.

The various processes and remote sensing disclosed herein may be combined consistent with the present disclosure.

In some embodiments, process 1100 (with reference to FIG. 11) may be modified to include the trajectory of the obstacle as part of the process. For example, process 1100 may be modified to include a block of determining a trajectory of the detected obstacle. This block may be placed between blocks 1130 and 1140. Then at block 1140, the process 1100 may include using the determined trajectory of the detected obstacle to calculate the quantity of acceleration control to be applied to the mobility apparatus 105. For example, the block 1140 may include calculating a sufficient reduction in acceleration so that the obstacle will pass out of the trajectory of the mobility apparatus 105 before the two trajectories intersect (e.g., slow down the mobility apparatus 105 so that obstacle 1310 fully passes across the front of mobility apparatus 105 before the two trajectories cross).

In some embodiments, process 1400 (with reference to FIG. 14) may be modified to include the type of the obstacle, such as disclosed with respect to block 1040 (with reference to FIG. 10). For example, the process 1400 may be modified so that the determination of 1440 is made additionally based on a determination of the type of the obstacle. For example, the determination may calculation eh trajectory of the obstacle by first determining the type of obstacle (e.g., trajectory of bicycle likely to remain straight, while trajectory of pedestrian more likely to change path of travel).

From the foregoing, it will be appreciated that specific embodiments of the invention have been described herein for purposes of illustration, but that various modifications may be made without deviating from the scope of the invention. Accordingly, the invention is not limited except as by the appended claims.

We claim:

1. A system, comprising:
a mobility apparatus;
a remote sensor configured to generate sensor data about a vicinity of the mobility apparatus;
a computing module configured to determine, based on the sensor data, whether an obstacle is present in the vicinity of the mobility apparatus; and
a drive controller configured to alter the acceleration of the mobility apparatus responsive to the determination by the computing module as to whether an obstacle is present in the vicinity of the mobility apparatus,
wherein the mobility apparatus is an electric scooter,
wherein the drive controller alters the acceleration of the mobility apparatus by applying a braking mechanism of the mobility apparatus,
wherein the braking mechanism is a regenerative braking mechanism, and
wherein the computing module is further configured to determine a trajectory of the obstacle.

2. The system of claim 1, wherein the remote sensor is a radar apparatus that emits electromagnetic waves in the millimeter range.

3. The system of claim 1, wherein the computing module is configured to determine whether an obstacle is present in the vicinity of the mobility apparatus by determining whether an object is present in one or more sectors sensed by the remote sensor.

4. The system of claim 3, wherein the computing module is further configured to determine in which sector sensed by the remote sensor the object is present.

5. The system of claim 4, wherein the computing module is further configured to determine whether the object is in a high risk sector for the mobility apparatus.

6. The system of claim 5, wherein the computing module is further configured to determine a type of obstacle that the object is.

7. A method comprising:
generating sensor data about a vicinity of a mobility apparatus using a remote sensor;
determining, based on the sensor data, whether an obstacle is present in the vicinity of the mobility apparatus; and
altering, using a drive controller, the acceleration of the mobility apparatus responsive to the determining of whether an obstacle is present in the vicinity of the mobility apparatus; and
determining a trajectory of the obstacle,
wherein the mobility apparatus is an electric scooter,
wherein the drive controller performs the altering of the acceleration of the mobility apparatus at least in part by applying a braking mechanism of the mobility apparatus, and
wherein the braking mechanism is a regenerative braking mechanism.

8. The method of claim 7, wherein the remote sensor is a radar apparatus that emits electromagnetic waves in the millimeter range.

9. The method of claim 7, wherein the determining of whether an obstacle is present in the vicinity of the mobility apparatus is performed at least in part by determining whether an object is present in one or more sectors sensed by the remote sensor.

10. The method of claim 9, further comprising:
determining in which sector sensed by the remote sensor the object is present.

11. The method of claim 10, further comprising:
determining whether the object is in a high risk sector for the mobility apparatus.

12. The method of claim 11, further comprising:
determining a type of obstacle that the object is.

\* \* \* \* \*